United States Patent
Sharma et al.

(10) Patent No.: US 10,278,048 B2
(45) Date of Patent: Apr. 30, 2019

(54) SYSTEMS AND METHODS FOR ENHANCING BUILDING MANAGEMENT SYSTEM INTERACTION AND VISUALIZATION

(71) Applicant: Johnson Controls Technology Company, Auburn Hills, MI (US)

(72) Inventors: Vikas Sharma, Delhi (IN); Sudhanshu Dixit, Bangalore (IN); Ashok Sridharan, Tiruchirappalli (IN); Shubhankar S. Roychoudhury, Thane (IN); Jeeva S, Salem District (IN); Christopher Brophy, Cedarburg, WI (US); Justin J. Seifi, Cedarburg, WI (US); Mark G. Freund, Wauwatosa, WI (US); Ankur Thareja, Alwar (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/872,572

(22) Filed: Jan. 16, 2018

(65) Prior Publication Data
US 2018/0206096 A1 Jul. 19, 2018

Related U.S. Application Data

(60) Provisional application No. 62/447,873, filed on Jan. 18, 2017.

(51) Int. Cl.
*H04W 4/80* (2018.01)
*H04W 64/00* (2009.01)
(Continued)

(52) U.S. Cl.
CPC ........... *H04W 4/80* (2018.02); *H04L 12/2809* (2013.01); *H04L 67/125* (2013.01); *H04L 67/18* (2013.01);
(Continued)

(58) Field of Classification Search
CPC ..... H04W 4/80; H04W 64/003; H04W 88/16; H04L 67/18; H04L 67/26; G05B 15/02
See application file for complete search history.

(56) References Cited

U.S. PATENT DOCUMENTS

| 5,754,767 A | 5/1998 | Ruiz |
| 8,874,135 B2 * | 10/2014 | Jarvis ........................ G01S 5/14 |
| | | 455/456.1 |

(Continued)

FOREIGN PATENT DOCUMENTS

| WO | WO 98/12610 | 3/1998 |
| WO | WO 2017/127373 | 7/2017 |

(Continued)

*Primary Examiner* — Joseph E Dean, Jr.
(74) *Attorney, Agent, or Firm* — Foley & Lardner LLP

(57) ABSTRACT

Implementations herein relate to visualization of interaction with a building management system (BMS). Such interaction may be facilitated with a smart headset that displays a three-dimensional model of an image with real-time data from the BMS to enable monitoring and control of the BMS. In one implementation, a system for locating a target in a building includes a server, a first wireless emitter, and an application on a mobile device. The first wireless emitter is associated with the target and configured to emit a first emitter identifier within a first range. The application is configured to detect the first emitter identifier when the mobile device is within the first range. The application is also configured to transmit the first emitter identifier to the server in response to detecting the first emitter identifier. The application is also configured to receive a first content from the server.

17 Claims, 11 Drawing Sheets

(51) Int. Cl.
*H04W 88/16* (2009.01)
*H04L 29/08* (2006.01)
*H04L 12/28* (2006.01)
*G05B 15/02* (2006.01)

(52) U.S. Cl.
CPC .......... *H04L 67/26* (2013.01); *H04W 64/003* (2013.01); *G05B 15/02* (2013.01); *H04W 88/16* (2013.01)

(56) References Cited

U.S. PATENT DOCUMENTS

| | | |
|---|---|---|
| 2009/0045939 A1 | 2/2009 | Holland et al. |
| 2015/0312696 A1 | 10/2015 | Ribbich et al. |
| 2015/0327010 A1* | 11/2015 | Gottschalk .............. G06F 17/50 455/456.1 |
| 2017/0212482 A1 | 7/2017 | Boettcher et al. |
| 2017/0212668 A1 | 7/2017 | Shah et al. |
| 2017/0322715 A1 | 11/2017 | Cohrt |
| 2017/0331333 A1* | 11/2017 | Clark ...................... H02J 50/80 |
| 2017/0352257 A1 | 12/2017 | Oliver et al. |
| 2017/0357225 A1 | 12/2017 | Asp et al. |
| 2017/0357490 A1 | 12/2017 | Park et al. |

FOREIGN PATENT DOCUMENTS

| | | |
|---|---|---|
| WO | WO 2017/192215 | 7/2017 |
| WO | WO 2017/218205 | 12/2017 |

* cited by examiner

SYSTEMS AND METHODS FOR ENHANCING BUILDING MANAGEMENT SYSTEM INTERACTION AND VISUALIZATION

CROSS-REFERENCE TO RELATED PATENT APPLICATION

This Application claims priority to U.S. Provisional Patent Application No. 62/447,873 filed on Jan. 18, 2017, the entire disclosure of which is incorporated by reference herein.

BACKGROUND

The present disclosure relates generally to a building management system (BMS) and more particularly to various systems and methods for enhancing interaction with, and visualization of, a BMS by a user such as an operator, a service engineer, a technician, an installation engineer, and, in some cases, a building user.

A BMS is, in general, a system of devices configured to control, monitor, and/or manage equipment in or around a building or building area. A BMS can include, for example, a HVAC system, a security system, a lighting system, a fire alerting system, any other system that is capable of managing building functions or devices, or any combination thereof.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

Interacting with various components of the BMS is often a cumbersome and expensive endeavor. Operators typically require a special skill and training to operate components in the BMS. Issues that arise with components of the BMS may be difficult to understand and may take time to diagnose. Accordingly, information from the BMS is typically only available to a select number of individuals. Even locating components of the BMS can be challenging in crowded control rooms. As a result, all other users of a building are not able to utilize information from the BMS to increase their enjoyment of the building.

SUMMARY

One implementation relates to a system for locating a target in a building. The system includes a server, a first wireless emitter, and an application on a mobile device. The first wireless emitter is associated with the target and configured to emit a first emitter identifier within a first range. The application is configured to detect the first emitter identifier when the mobile device is within the first range. The application is also configured to transmit the first emitter identifier to the server in response to detecting the first emitter identifier. The application is also configured to receive a first content from the server, the first content corresponding to the first emitter identifier. The application is also configured to display the first content on the mobile device.

Another implementation relates to a system for displaying content to a user. The system includes a marker, a gateway, and an application on a visualization device worn by a user and communicable with a gateway. The marker is associated with a target. The gateway is communicable with a building management system (BMS) controller. The application is configured to automatically detect the marker when the user is proximate the marker. The application is also configured to read the marker to obtain a target identifier corresponding to the target. The application is also configured to transmit the target identifier to the gateway. The gateway is configured to transmit the target identifier to the BMS controller. The gateway is also configured to receive content from the BMS controller, the content corresponding to the target. The application is further configured to receive the content from the gateway and display the content to the user.

Yet another implementation relates to a system for providing an annunciation to a user. The system includes a server, an application on a mobile device communicable with the server, and a wireless emitter associated with a target in a building and communicable with the mobile device. The application is configured to selectively control the auxiliary device when the mobile device is within a range of the wireless emitter. The application is also configured to determine a distance between the mobile device and the wireless emitter when the mobile device is within a range of the wireless emitter. The application is also configured to display the distance to the user on the mobile device.

Yet another implementation relates to a method for determining a location of a target in a building. The method includes the steps of: receiving, by an application on a mobile device, a first emitter identifier from a first wireless emitter associated with the target; causing, by the application, the mobile device to transmit the first emitter identifier to a server; receiving, by the mobile device, a first content from the server, the first content corresponding to the first emitter identifier; and causing, by the application, the mobile device to display the first content to a user.

Yet another implementation relates to a method for determining the location of a target in a building. The method includes receiving, by a mobile device, an emitter identifier from a wireless emitter associated with the target. The method also includes transmitting, by the mobile device, the emitter identifier to a server. The method also includes receiving, by the mobile device, content from the server, the content corresponding to the emitter identifier. The method also includes displaying the content on the mobile device.

Yet another implementation relates to a system for locating a target in a building. The system includes a wireless emitter associated with the target, a mobile device, and a server. The wireless emitter is configured to emit an emitter identifier within a first range. The mobile device is configured to detect the emitter identifier when the mobile device is within the first range. The mobile device is configured to transmit the emitter identifier to the server is response to detecting the emitter identifier. The mobile device is also configured to receive content from the server, the content corresponding to the emitter identifier. The mobile device is also configured to display the content on the mobile device.

Yet another implementation relates to a system for displaying content to a user. The system includes a visualization device worn by a user, a marker associated with a target, and a gateway communicable with the visualization device and a BMS controller. The visualization device is configured to automatically detect the marker when the user is proximate the marker. The visualization device is configured to read the marker to obtain a target identifier. The visualization device is configured to transmit the target identifier to the gateway. The gateway is configured to transmit the target identifier to the BMS controller. The gateway is configured to receive content from the BMS controller, the content corresponding to the target. The visualization device is configured to receive the content from the gateway. The visualization device is configured to display the content to the user.

Yet another implementation relates to a system for providing an annunciation to a user. The system includes a wireless emitter associated with a target, a mobile device, and a server communicable with the mobile device. The wireless emitter is communicable with the mobile device. The wireless emitter includes an auxiliary device selectively controllable to emit an annunciation. The mobile device is configured to selectively control the auxiliary device when the mobile device is within a range of the wireless emitter. The mobile device is configured to determine a distance between the mobile device and the wireless emitter when the mobile device is within a range of the wireless emitter. The mobile device is configured to display this distance to the user.

DETAILED DESCRIPTION

Overview

Figure 1:
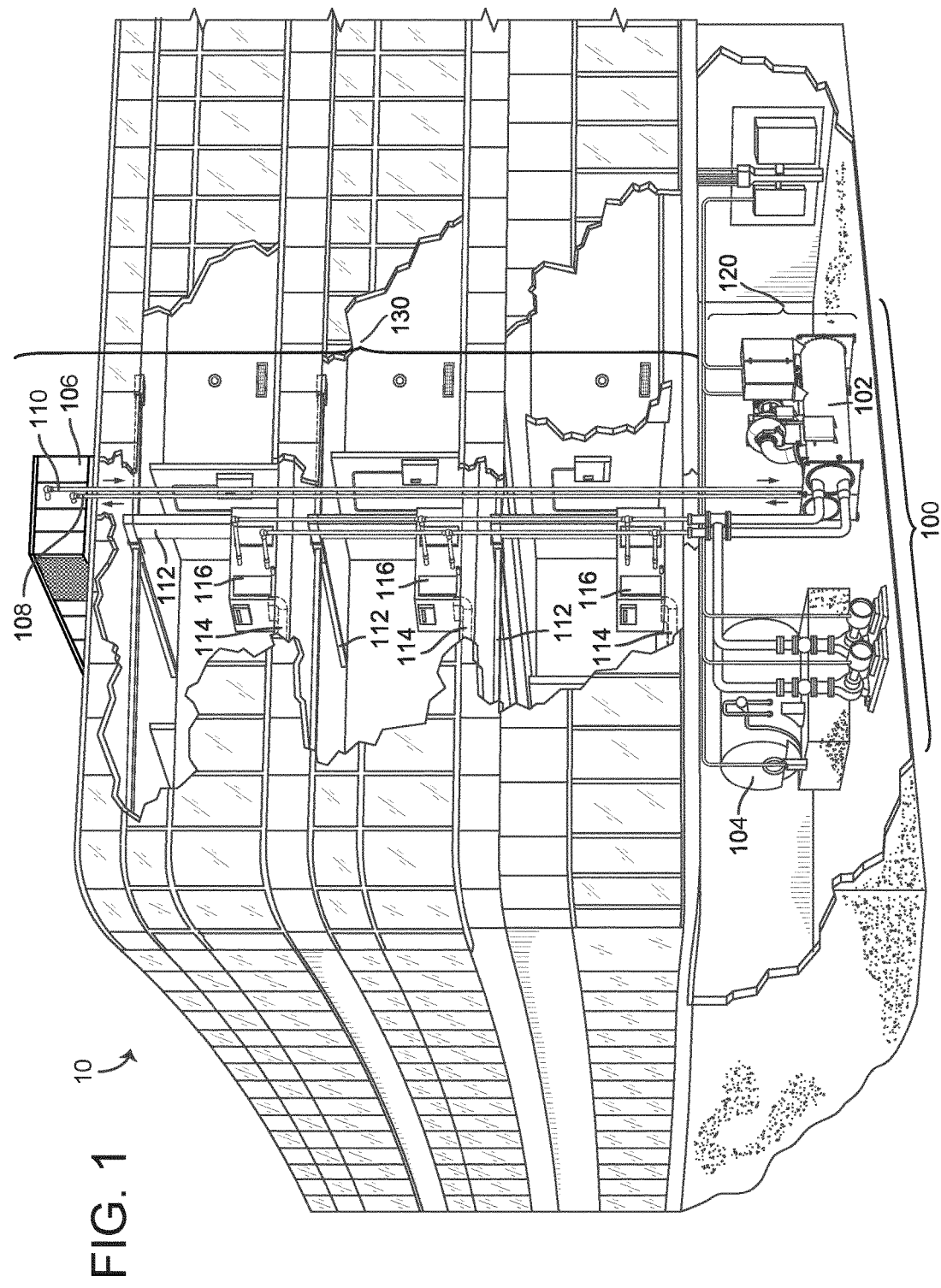
FIG. 1 is a drawing of a building equipped with a building management system (BMS), according to an exemplary embodiment of the present disclosure.

Referring generally to the FIGURES, systems and methods for visualizing and interacting with targets (e.g., components, rooms, zones, floors, etc.) in a building having a building management system (BMS) are shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The systems and methods described herein may be used to locate targets in the building and to visualize and control content associated with these targets. In some embodiments, the systems and methods described herein integrate wireless emitters within the building. The wireless emitters are each associated with a target. The wireless emitters may broadcast emitter identifiers which are detected by a device utilized by the user to facilitate location of the corresponding targets in the building. This may be particularly advantageous for targets that are difficult to locate (e.g., such as components in a crowded control room, etc.) and for users that have less experience.

When the user is within range of a wireless emitter, the user may be provided with content for the target associated with the wireless emitter. The content may include, for example, operating characteristics, occupancy, and controls associated with the target. This content may be filtered depending on an access level of the user. For example, a manager may be provided controls for a chiller while his subordinate is provided only with energy consumption readings from the chiller. The content may be displayed to the user through a mobile device (e.g., smart phone, laptop, tablet, etc.) or through a visualization device. For example, the content may be provided to the user in a 3D augmented overlay.

Additionally or alternatively to the wireless emitters, the target may be associated with a marker. The marker may be automatically detected by the visualization device and read by the visualization device to determine a target identifier. The visualization device transmits the target identifier to a gateway which returns content associated with the target, based on the target identifier. In some applications, the wireless emitter is used to assist the user in locating the target and the marker is used to provide content to the user.

The wireless emitters may include auxiliary devices that are selectively controllable to annunciate their location to the user. For example, the wireless emitters may include speakers that are configured to selectively emit a sound (e.g., chirp, beep, noise, etc.) that may be heard by the user. Based on the distance of the mobile device to the wireless emitter, various characteristics (e.g., volume, pitch, frequency, etc.) of the sound may be changed. For example, as the user becomes closer to the wireless emitter, the sound may become more high pitched or may be pulsed more rapidly.

In various implementations, the wireless emitters communicate with the mobile device and/or the visualization device over Bluetooth (e.g., Bluetooth low energy, etc.). In this way, the wireless emitters are relatively inexpensive, have relatively low power requirements, and are relatively easy to install (e.g., retrofit, etc.) in a building. Additional features and advantages of the present invention are described in greater detail below.

Building Management System and HVAC System

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS which includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
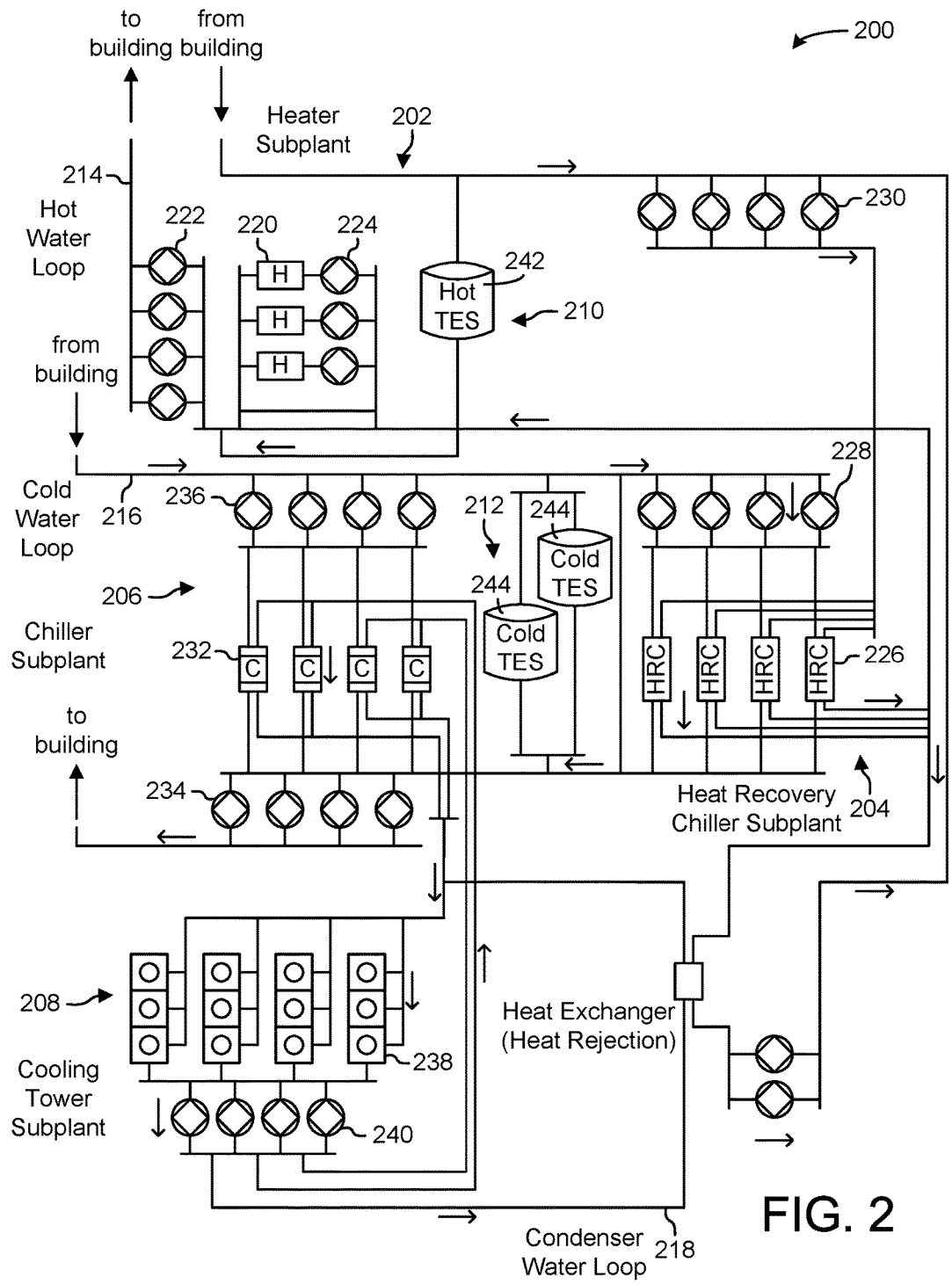
FIG. 2 is a block diagram of a waterside system which may be used to provide heating and/or cooling to the building of FIG. 1, according to an exemplary embodiment of the present disclosure.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
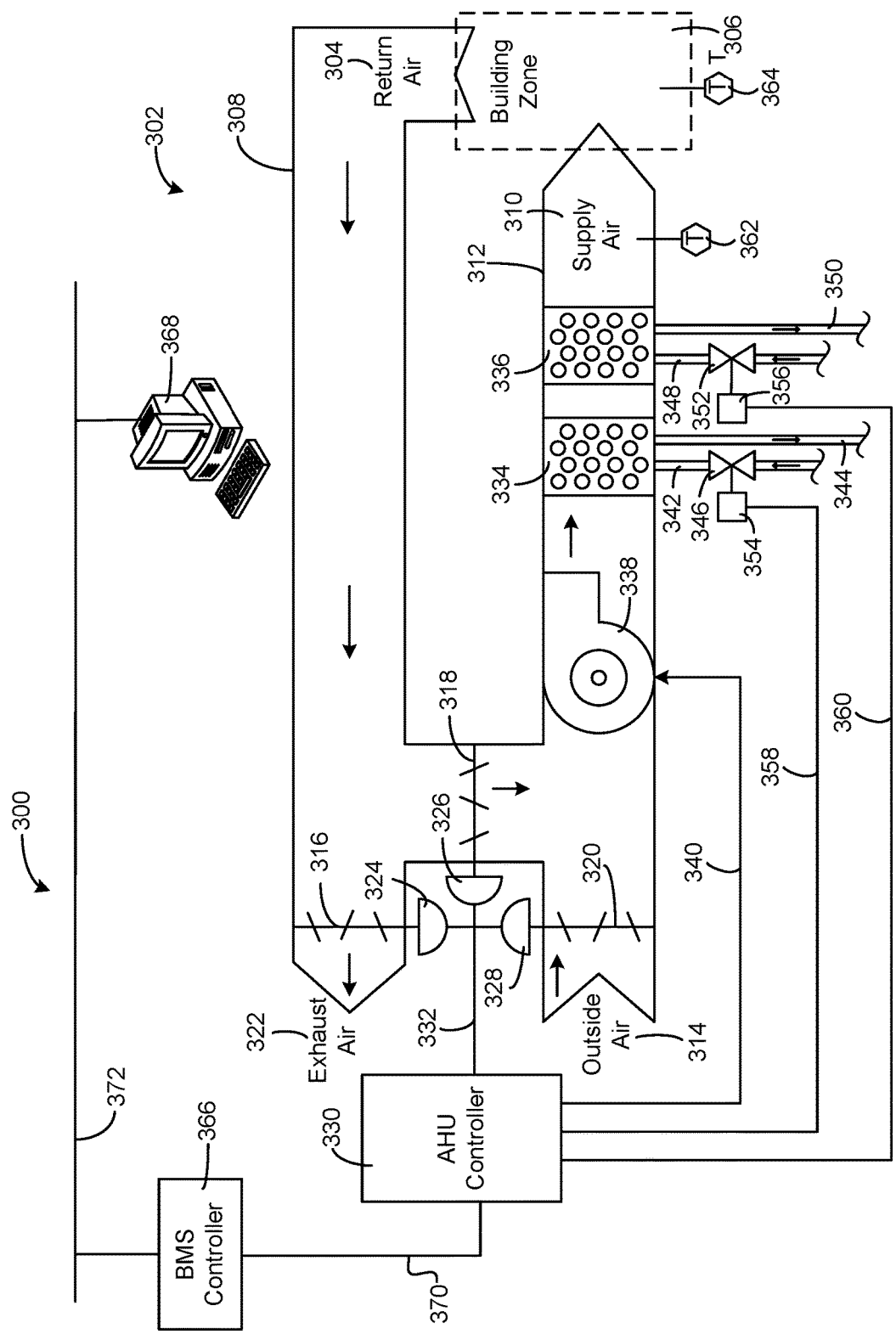
FIG. 3 is a block diagram of an airside system which may be used to provide heating and/or cooling to the building of FIG. 1, according to an exemplary embodiment of the present disclosure.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
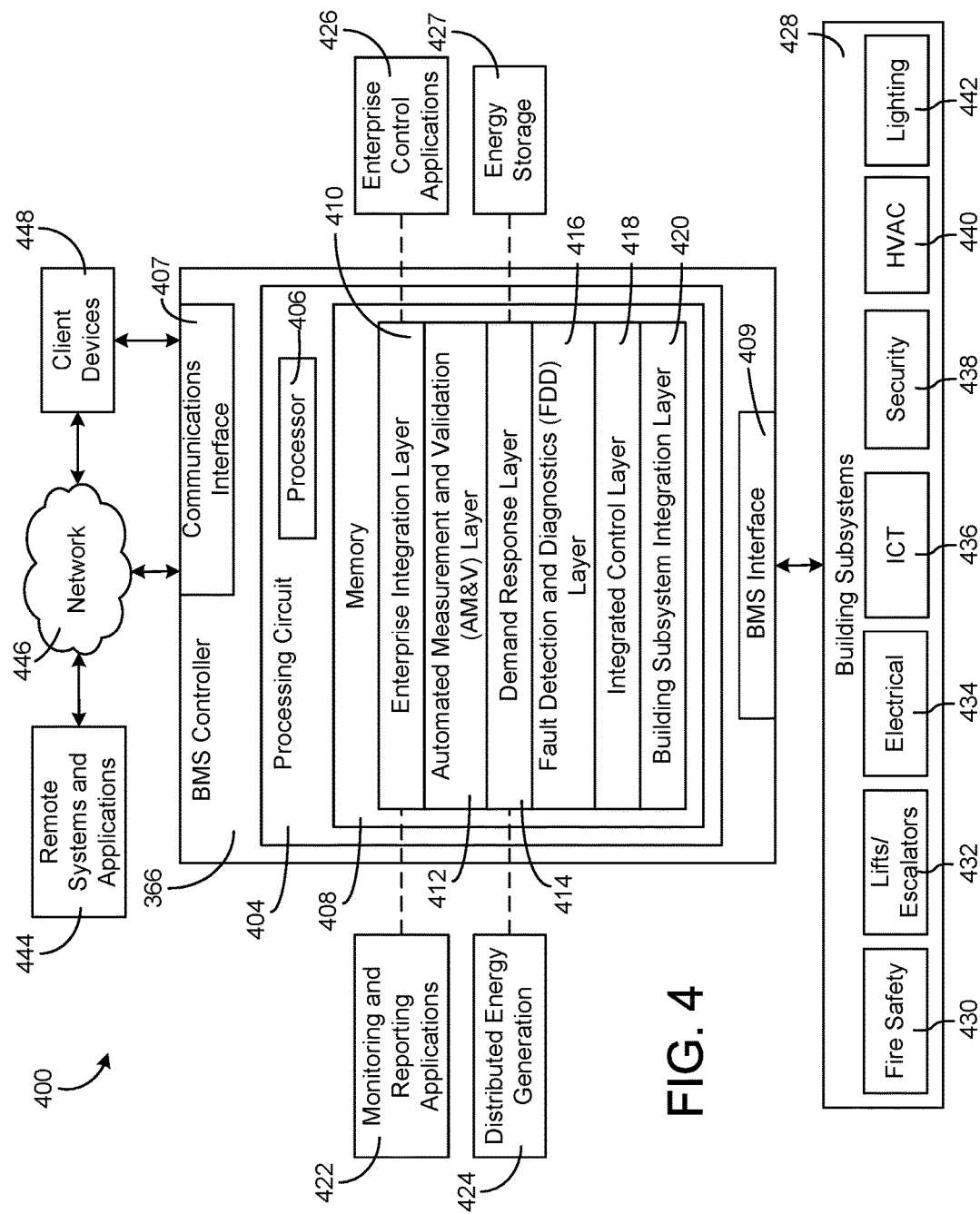
FIG. 4 is a block diagram of a BMS which may be used to monitor and control building equipment in the building of FIG. 1, according to an exemplary embodiment of the present disclosure.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Wireless Emitter Integration to Provide Content

Figure 5:
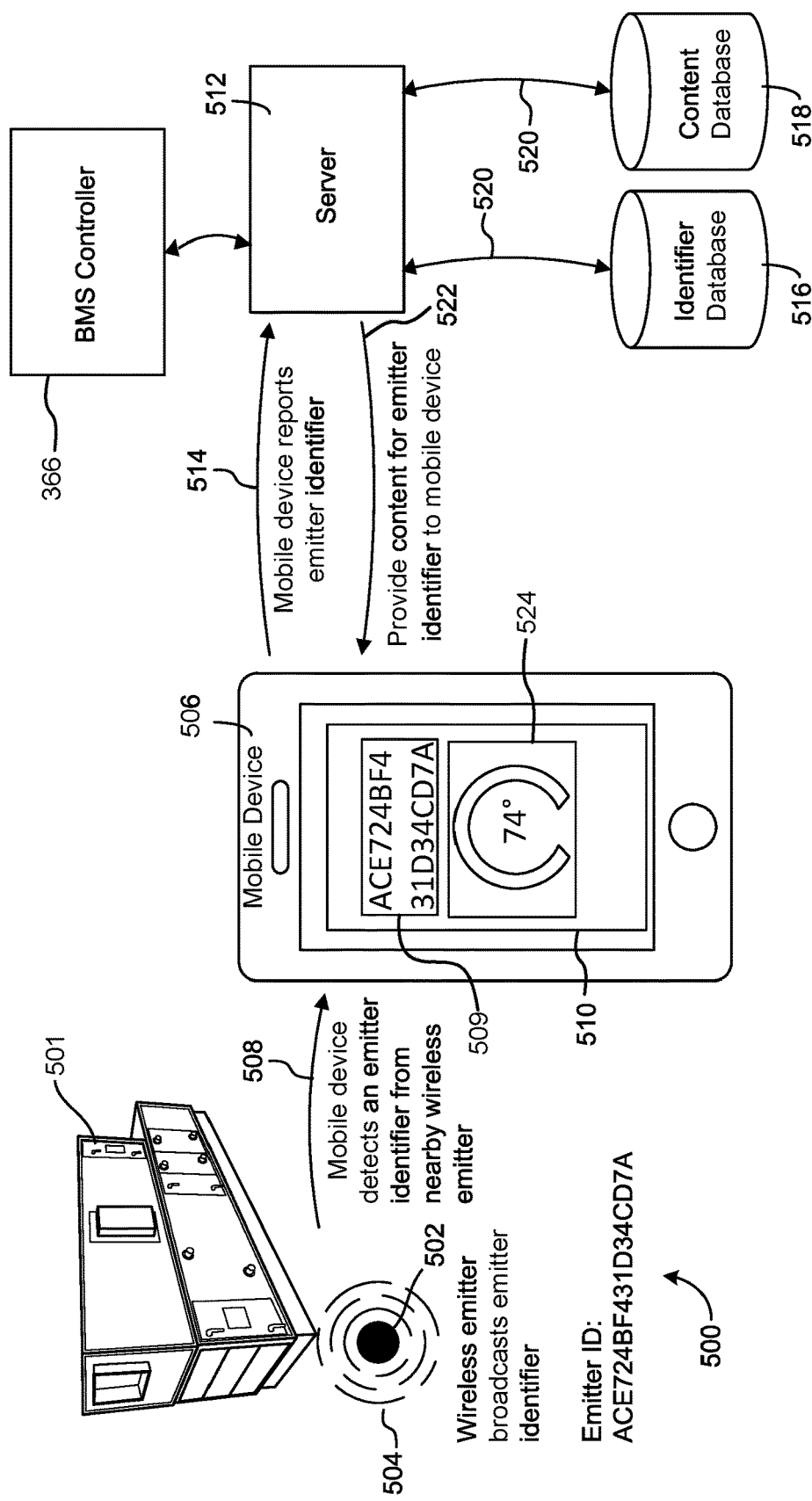
FIG. 5 is a flow diagram illustrating a process for receiving content for a target of the building of FIG. 1 on a mobile device using a wireless emitter associated with the target and an application running on the mobile device, according to an exemplary embodiment.

Referring now to FIG. 5, a flow diagram illustrating a process 500 for receiving information about a target 501 is shown. Target 501 may be a component, room, zone, or other aspect of building 10. For example, target 501 may be a component of HVAC system 100 (e.g., chiller 102, boiler 104, AHU 106, etc.). A building (e.g., building 10) is equipped with at least one wireless emitter (e.g., beacon, transmitter, etc.) 502. Each wireless emitter 502 may be associated with a different target 501 and a different emitter identifier. The emitter identifier may be unique to the particular wireless emitter 502 and, similarly, unique to the particular target 501 it is associated with. The emitter identifier may be an alpha-numeric string (e.g., ACE724BF431D34CD7A, etc.). Although only one wireless emitter 502 is shown in FIG. 5, many wireless emitters 502 may be individually associated various targets within the building.

Wireless emitters 502 may be utilized in various buildings such as, for example, hospitals, educational institutions (e.g., schools, libraries, universities, etc.), airports, cinema halls, museums, train stations, campuses, and other similar buildings. Wireless emitters 502 may be implemented in both new buildings and in retrofit applications (e.g., existing buildings, etc.). For example, wireless emitters 502 may easily be mounted on a wall or on a ceiling. Through the use of process 500, user interaction with a building is increased, energy savings may be increased, and the desirability of the building, including the BAS and/or BMS, is increased.

According to an exemplary embodiment, each wireless emitter 502 continuously broadcasts its emitter identifier (step 504). Wireless emitter 502 may be, for example, a Bluetooth device (e.g., Bluetooth low energy, Bluetooth 4.0, etc.), a Wi-Fi device, a near field communication (NFC) device, a RFID device, a ZigBee device, a beacon device, a portable communications device, or any combination thereof. According to various embodiments, wireless emitter 502 is capable of receiving transmissions (e.g., control signals, instructions, updates, queries, etc.) and transmitting its emitter identifier. In other embodiments, wireless emitter 502 is only capable of transmitting its emitter identifier and is not capable of receiving transmissions. Wireless emitter 502 may have a port (e.g., USB port, etc.) for facilitating configuration (e.g., installation, updating, calibration, etc.) of wireless emitter 502.

According to an exemplary embodiment, wireless emitter 502 is configured to communicate via Bluetooth 4.0 (including Bluetooth low energy) communication protocol, and wireless emitter 502 is battery-powered. When wireless emitter 502 utilizes Bluetooth 4.0 communication protocols, wireless emitter 502 is relatively low-cost. Wireless emitter 502 may, additionally or alternatively, receive power from an external power source (e.g., wall outlet, etc.). Because the power consumption of wireless emitter 502 is relatively small, wireless emitter 502 may be powered for long periods of time, such as several months or several years. Wireless emitter 502 may be relatively small (i.e., relative to the size of components). In some applications, wireless emitter 502 may be discretely placed near components.

Still referring to FIG. 5, a mobile device 506 detects the emitter identifier emitted by wireless emitter 502 (step 508). Mobile device 506 may be, for example, a smart phone, a personal electronic device, a laptop computer, a tablet, a Bluetooth device (e.g., Bluetooth low energy, Bluetooth 4.0, etc.), a Wi-Fi device, a NFC device, a RFID device, a ZigBee device, a portable communications device, or any combination thereof. For example, wireless emitter 502 and mobile device 506 may have Bluetooth low energy (e.g., Bluetooth Smart, etc.) capability. Following this example, mobile device 506 may detect wireless emitter 502 when mobile device 506 is within range of wireless emitter 502. In some applications, the range of wireless emitter 502 may be up to fifty meters. In other applications, the range of wireless emitter 502 may be between, for example, fifty and one-hundred meters. Depending on the range of wireless emitters 502, BMS controller 366 may be able to determine the location of mobile device 506 within a few meters.

In various embodiments, this detection causes the emitter identifier of wireless emitter 502 to be displayed on mobile device 506 (step 509). In this fashion, wireless emitter 502 announces its presence to mobile device 506 when mobile device 506 is in range of wireless emitter 502. In some applications, the emitter identifier is translated from an alpha-numeric string (e.g., ACE724BF431D34CD7A, etc.) to common terms associated with wireless emitter 502. For example, the emitter identifier displayed on mobile device 506 may be the name of a particular target 501 (e.g., chiller, AHU, etc.) of an HVAC system.

According to an exemplary embodiment, mobile device 506 is configured to run a mobile application 510. In one example, mobile device 506 is only capable of detecting emitter identifiers emitted by wireless emitters 502 when mobile application 510 is running. Mobile application 510 may transmit push notifications to mobile device 506. For example, when mobile device 506 detects an emitter identifier, mobile application 510 may cause a notification to be pushed to a display on mobile device 506. In this way, mobile application 510 may effectively change a state of mobile device 506 when an emitter identifier associated with wireless emitter 502 is detected. Mobile application 510 may be, for example, an iOS® application, an Android® application, a Windows® application, or other similar application.

In FIG. 5, mobile device 506 is shown connecting to a server 512 (e.g., at a predefined IP address, via a wireless data connection, etc.) and transmitting the detected emitter identifier (step 514) to server 512. Mobile device 506 may communicate with server 512 over various communication technologies such as wireless communication technologies (e.g., 5G, 4G, 4G LTE, 3G, etc.), Bluetooth (e.g., Bluetooth low energy, Bluetooth 4.0, etc.), Wi-Fi, NFC, ZigBee, other similar communications, or any combination thereof. According to various embodiments, server 512 is a cloud server. Server 512 may also be an enterprise server, server farm, or other similar server configuration.

Once server 512 receives the emitted identifier from mobile device 506, server 512 may connect to an identifier database 516 and/or a content database 518 (step 520). Identifier database 516 contains a library of the emitter identifiers of all targets 501 contained within the building. Similarly, content database 518 contains a library of all content (e.g., alarms, measurements, data, commands, etc.) associated with each emitter identifier contained within identifier database 516. Content database 518 may be populated by a BMS for the building. For example, for an emitter identifier that corresponds with a chiller, content database 518 may contain alarms, temperature readings, air flow speeds, power consumption, occupancy, illumination levels, and other similar metrics, as well as commands for increasing and decreasing a temperature set point of the chiller, commands for selecting various energy consumption plans (e.g., energy saver, high performance, sleep, etc.), and other similar commands. Content database 518 may also contain configuration information (e.g., location information, proximity information, service information, usage information, installation information, upgrade information, etc.) corresponding to each of targets 501 in the building. For example, content database 518 may contain previous service dates and a suggested next service date for a chiller in the building. In some embodiments, identifier database 516 and content database 518 are combined and contained within a common database.

Still referring to FIG. 5, server 512 provides (e.g., communicates, transmits, etc.) (in step 522) the content from content database 518 for the received emitter identifier, as determined by identifier database 516, to mobile device 506. Mobile device 506 then displays the received content to the user (step 524). The content may be displayed through mobile application 510. In some cases, the content is pushed to mobile device 506. For example, when mobile device 506 receives content from server 512, mobile application 510 may cause a notification to be pushed to a display on mobile device 506. According to an exemplary embodiment, the content pushed to mobile device 506 is displayed to a user in a notification that is relevant to the location of the user and the time the notification was displayed to the user. In this way, mobile application 510 may effectively change a state of mobile device 506 when content from server 512 is provided to mobile device 506. In some embodiments, the content provided to mobile device 506 causes mobile application 510 to display a location-specific user interface (e.g., specific to the location of target 501, etc.).

According to one example, a user may utilize mobile application 510 for assistance when looking for target 501 (e.g., conference room, break room, copy room, etc.) in the building. In this example, the user may select or enter target 501 that they are looking for in mobile application 510 (e.g., select the target room from a list of rooms in the building, etc.). Mobile device 506 then transmits target 501 to server 512 which retrieves the emitter identifier associated with target 501 from identifier database 516 and transmits the emitter identifier to mobile device 506. As soon as mobile device 506 detects an emitter identifier that matches the emitter identifier for target 501 sent from wireless emitter 502 located in the target room, mobile device 506 may notify the user (e.g., through a push notification, etc.) on mobile device 506. This notification may include content from content database 518 that is associated with wireless emitter 502 for target 501. For example, the notification may include an occupancy of target 501.

According to another example, a user may utilize mobile application 510 for assistance when looking for target 501 (e.g., AHU, chiller, boiler, control panel, valve, thermostat, light, etc.) in the building. In this example, the user may select or enter target 501 that they are looking for in mobile application 510 (e.g., select the target component from a list of components in the building, etc.). Mobile device 506 then transmits target 501 to server 512 which retrieves the emitter identifier associated with target 501 from identifier database 516 and transmits the emitter identifier to mobile device 506. As soon as mobile device 506 detects an emitter identifier that matches the emitter identifier for target 501 sent from wireless emitter 502 located on target 501, mobile device 506 may notify the user (e.g., through a push notification, etc.) on mobile device 506. This notification may include content from content database 518 that is associated with wireless emitter 502 for target 501. For example, the notification may include an occupancy of target 501.

In some embodiments, when mobile device 506 connects to sever 512, server 512 determines an access level (e.g., security level, clearance level, etc.) of mobile device 506. In other embodiments, mobile device 506 transmits the access level to server 512. The access level of mobile device 506 may be utilized by server 512 to determine what content to provide to mobile device 506. For example, server 512 may only provide data (e.g., temperature, humidity, pressure, etc.) to a low access level mobile device 506, such as a mobile device of a general employee, and server 512 may provide data and commands (e.g., temperature control, light control, power control, etc.) to a high access level mobile device 506, such as a mobile device of an engineer or manager. In another example, server 512 provides location data of various targets to all low access level mobile devices 506.

In another application, a user is provided with temperature updates on mobile device 506 as the user walks through a building. For example, as the user passes wireless emitters 502, server 512 provides a temperature for a zone surrounding each wireless emitter 502 to mobile device 506. As the user enters each zone, mobile device 506 may display the temperature of that zone (i.e., via a push notification, etc.).

In other applications, a user is provided with a catalogue of all nearby components corresponding to all wireless emitters 502 in range of mobile device 506. The catalogue may be utilized by a user to quickly sort through various parameters (e.g., operational status, etc.) of the nearby components.

In some embodiments, process 500 does not include step 509. In these embodiments, the emitter identifier is detected by mobile device 506 (step 508) and then transmitted directly to server 512 (step 514). These implementations may be useful when there are multiple emitter identifiers in a building. For example, if a user is walking through an equipment room it may be helpful to only display content received from server 512 rather than each individual emitter identifier.

According to an alternative embodiment, mobile device 506 queries the user on mobile device 506 before transmitting the emitter identifier to server 512. For example, detection of an emitter identifier may cause a notification to be pushed to mobile device 506 that indicates (e.g., "would you like to connect to 'Second Floor AHU'?", etc.). In this way, a user can control which emitter identifiers are transmitted to server 512.

According to various embodiments, BMS controller 366 is communicable with server 512. In these embodiments, BMS controller 366 may observe communications between mobile device 506 and server 512 in order to facilitate optimum environment management of the building. For example, based on the emitter identifiers received by server 512, BMS controller 366 can determine the location of various mobile devices 506, and therefore various individuals, within the building. In this way, BMS controller 366 may determine occupancy of target areas and the consequences of that occupancy on management of the building as a function of time.

In one example, BMS controller 366 may use the occupancy information to facilitate automatic meeting room scheduling (AMS). For example, BMS controller 366 may determine which rooms in a building are empty based on the information from wireless emitter 502, as transmitted through mobile device 506, and then schedule meetings in the empty rooms rather than in other rooms that may have a higher occupancy. BMS controller 366 may also facilitate visualization by a user of which users are in which rooms in the building.

For example, BMS controller 366 may use the occupancy information to provide additional cooling to rooms with greater occupancy. In one application, BMS controller 366 uses the occupancy information to construct a heat map for the building. This heat map may reflect substantially real-time occupancy within various rooms, floors, or zones in the building.

In another example, the occupancy of these target areas may be used in a "smart" evacuation (i.e., in the event of a fire, etc.) where the evacuation of the building accounts for the occupancy of these target areas. BMS controller 366 may guide certain individuals to the nearest safe area in the case of a disaster. For example, BMS controller 366 may determine temperatures at various locations in the building and the relative location of users, based on emitter identifiers from wireless emitters 502, to determine what the nearest safe area for each user or for groups of users. In this way, BMS controller 366 may facilitate improved disaster management of the building.

BMS controller 366 may also use the occupancy information to implement occupancy tracking within the building or tracking of a target user within the building. For example, BMS controller 366 may use this information to predict a path of the target user through the building. BMS controller 366 may be implemented to help users locate a target user in the building. In other embodiments, BMS controller 366 may use this information to perform periodic guard checking throughout the building. BMS controller 366 may also integrate server 512, and therefore wireless emitter 502, into an internet-of-things (IoT) for providing data analytics about the building to various other components of the building.

Following process 500, mobile device 506 may change states according to the content provided by server 512. For example, mobile device 506 may emit a sound that changes in volume, pitch, frequency, or otherwise as a user is nearing wireless emitter 502. Similarly, a color, pattern, image, or icon displayed on mobile device 506 may change as a result of a user moving further away from wireless emitter 502. In another example, mobile device 506 may vibrate with increasing frequency, force, or otherwise as a user is nearing wireless emitter 502.

Figure 6:
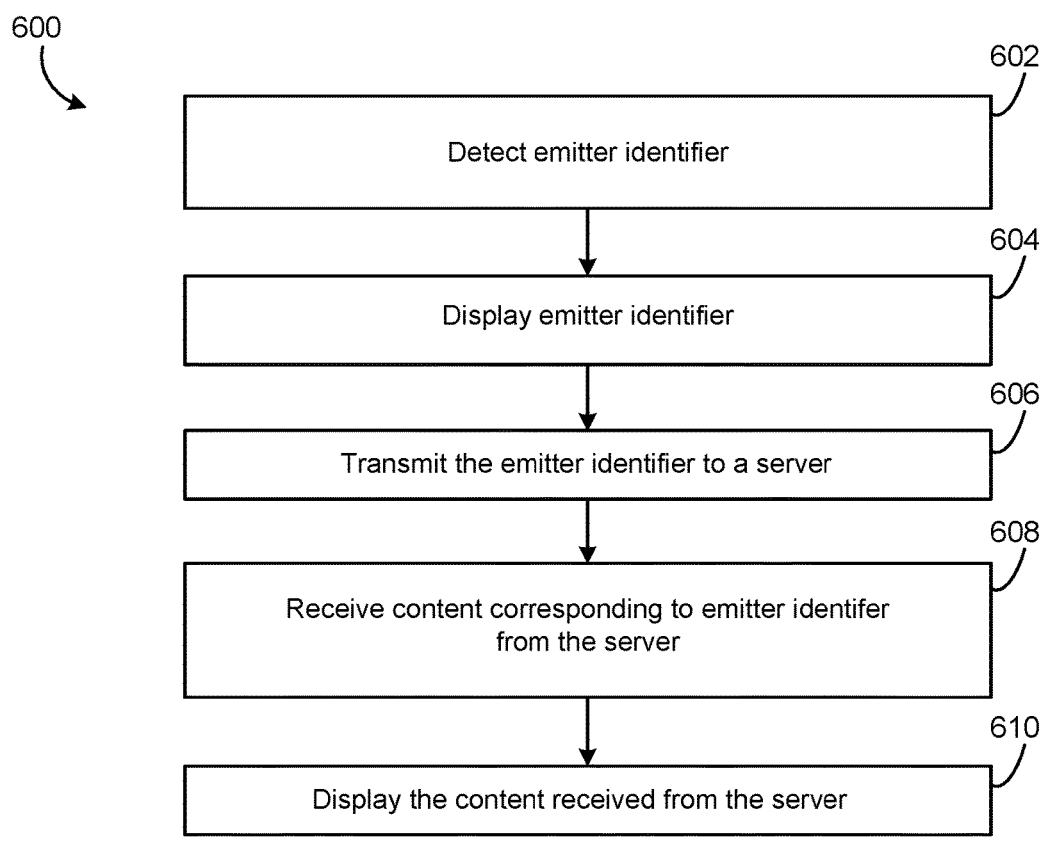
FIG. 6 is a flow diagram illustrating a process for implementing the process shown in FIG. 5 on a mobile device, according to an exemplary embodiment.

FIG. 6 illustrates a process 600 of implementing process 500 on mobile device 506. Process 600 includes using mobile device 506 to detect an emitter identifier (step 602), display the detected emitter identifier (step 604), transmit the detected emitter identifier to server 512 (step 606), receive content corresponding to the detected emitter identifier from server 512 (step 608), and display the content received from server 512 (step 610).

Figure 7:
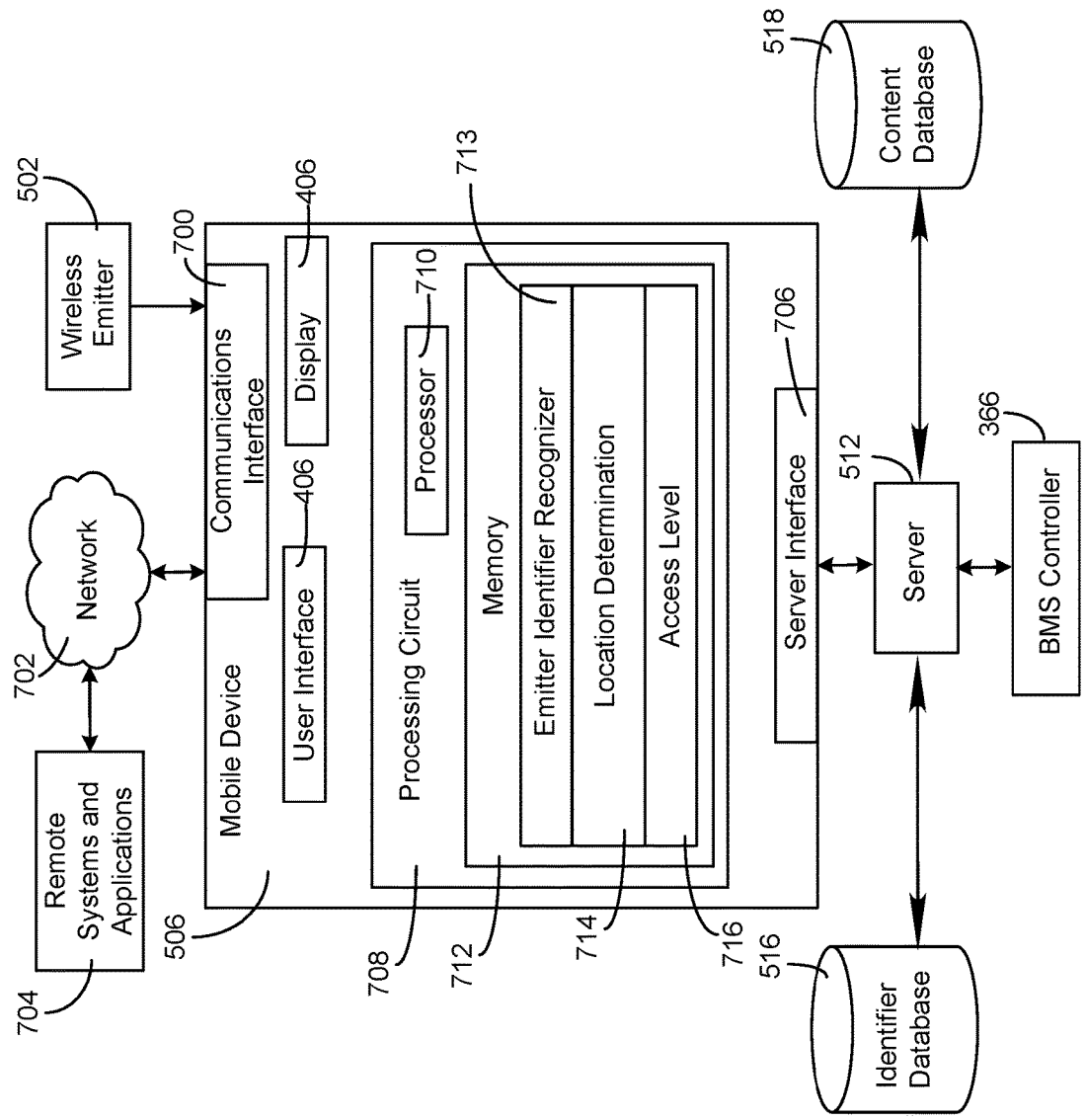
FIG. 7 is a block diagram illustrating a mobile device capable of implementing the process shown in FIG. 5, according to an exemplary embodiment.

FIG. 7 illustrates mobile device 506, according to an exemplary embodiment. As shown in FIG. 7, mobile device 506 includes a communications interface 700. Communications interface 700 is configured to interface with wireless emitter 502. For example, communications interface 700 may receive emitter identifiers transmitted by wireless emitter 502. Communications interface 700 may also facilitate connection between mobile device 506 and a network 702. Network 702 may be various networks such as a cellular network, a Wi-Fi network, a local area network, a computer network, or other similar networks. Network 702 may facilitate connection between mobile device 506 and remote systems and applications 704. Remote systems and applications 704 may be, for example, a BMS, a BAS, a global positioning systems network, and other similar systems and applications. Through the use of network 702 and remote systems and applications 704, mobile device 506 may, for example, determine a location of mobile device 506 in the building. According to various embodiments, remote systems and applications 704 provide remote assistance and guidance to the user. For example, remote systems and applications 704 may assist a user in utilizing mobile application 510.

Mobile device 506 also includes a server interface 706. Server interface 706 is configured to facilitate communication between mobile device 506 and server 512. For example, server interface 706 may transmit an emitter identifier received from wireless emitter 502 by communications interface 700 to server 512 and then receive content corresponding to the emitter identifier from content database 518 via server 512.

Mobile device 506 also includes a processing circuit 708. Processing circuit 708 includes a processor 710 and a memory 712. Processing circuit 708 may be communicably connected to server interface 706 and/or communications interface 700 such that processing circuit 708 and the various components thereof can send and receive data via server interface 706 and/or communications interface 700. Processor 710 can be implemented as a general purpose processor, an application specific integrated circuit (ASIC), one or more field programmable gate arrays (FPGAs), a group of processing components, or other suitable electronic processing components.

Memory 712 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 712 may be or include volatile memory or non-volatile memory. Memory 712 may include database components, object code components, script components, or any other type of information structure for supporting the various activities and information structures described in the present application. According to an exemplary embodiment, memory 712 is communicably connected to processor 710 via processing circuit 708 and includes computer code for executing (e.g., by processing circuit 708 and/or processor 710) one or more of the processes described herein.

According to various embodiments, memory 712 includes various modules for controlling operation of mobile device 506. In an exemplary embodiment, memory 712 includes an emitter identifier recognizer module 713. Emitter identifier recognizer module 713 is configured to determine when data received by communications interface 700 is an emitter identifier. In an exemplary operation, if emitter identifier recognizer module 713 determines that data received by communications interface 700 is an emitter identifier, processing circuit 708 instructs server interface 706 to transmit the received emitter identifier to server 512.

Memory 712 may also include a location determination module 714. Location determination module 714 may be configured to utilize communications interface 700 and/or server interface 706 to determine a relative and/or absolute location of mobile device 506. For example, in some applications the user can be guided to a destination target 501 through linking of several waypoint targets 501 where each target 501 has its own emitter identifier that is detected by mobile device 506. For example, the user can first select or enter a destination target 501 in mobile application 510. Processing circuit 708 can determine the location of the destination target 501 by obtaining the location from server 512 via server interface 706. In some implementations, location determination module 714 then compares the location of the destination target 501 and the absolute location of mobile device 506 to generate a path for the user to follow leading towards the destination target 501.

In other implementations, server 512 determines if any wireless emitters 502 are along a path between the destination target 501 and the location of wireless emitter 502 corresponding to the emitter identifier received from server interface 706, as detected by communications interface 700. If wireless emitters 502 are along the path, server transmits the emitter identifiers for these wireless emitters 502, along with a waypoint sequence that orders the emitter identifiers along the path, to mobile device 506. Processing circuit 708 then navigates the user based on the waypoint sequence. For example, the waypoint sequence may direct the user from the original wireless emitter 502 to a second wireless emitter 502 having a second emitter identifier and from the second wireless emitter 502 to a third wireless emitter 502 having a third emitter identifier where the waypoint sequence specifies the second emitter identifier and the third emitter identifier.

In one implementation, BMS controller 366 can construct a waypoint sequence to lead a user through a building on a guided tour. The guided tour may be, for example, an introductory tour of all targets 501 in the building based on health (e.g., maintenance status, etc.) of components and based on operation parameters of targets 501. For example, the waypoint sequence may direct the user first to a wireless emitter 502 corresponding to a chiller, then to a wireless emitter 502 corresponding to an AHU, and then to a wireless emitter 502 corresponding to a control panel. In this way, BMS controller 366 may facilitate expedited training of technicians, building managers, and other similar individuals.

According to various embodiments, memory 712 includes an access level module 716. Access level module 716 is configured to determine an access level of the user of mobile device 506. The access level may be transmitted along with the emitter identifier by server interface 706 to server 512. Server 512 may use the access level to determine what content, from content database 518, to transmit back to server interface 706. Access level module 716 may determine the access level of the user through various mechanisms. For example, access level module 716 may determine the access level of the user based on entered credentials (e.g., username and password, personal identification credentials, passcode, security question, device ID, network ID, etc.). In other examples, access level module 716 may determine the access level of the user based on biometric inputs (e.g., face recognition, fingerprint recognition, iris recognition, etc.).

Figure 8:
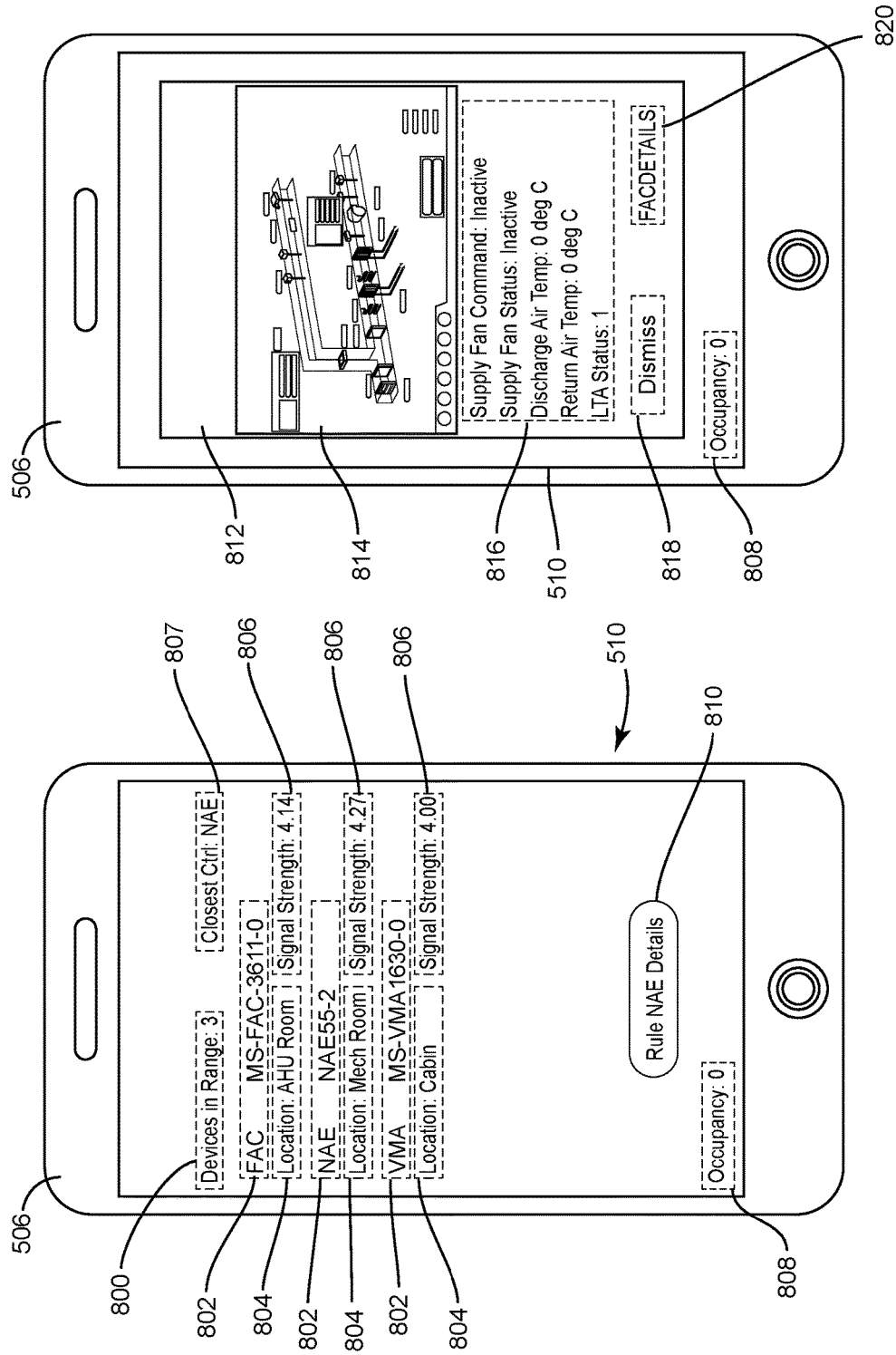
FIG. 8A is an illustration of a mobile application capable of implementing part of the process shown in FIG. 5 on a mobile device, according to an exemplary embodiment.
FIG. 8B is another illustration of a mobile application capable of implementing part of the process shown in FIG. 5 on a mobile device, according to an exemplary embodiment.

FIGS. 8A and 8B illustrate various implementations of mobile application 510 on mobile device 506. As shown in FIG. 8A, mobile application 510 includes a target indicator 800. Target indicator 800 conveys the number of targets 501 that are in range of mobile device 506. For example, if three wireless emitters 502 are transmitting emitter identifiers that are detected by mobile device 506, then target indicator 800 may convey that three components are in range of mobile device 506.

For each target 501 that is in range of mobile device 506, mobile application 510 may cause a target identification 802, a target location 804, and a signal strength indication 806 to be displayed. Each of target identification 802, target location 804, and signal strength indication 806 is a function of the emitter identifier received from each wireless emitter 502. Target identification 802 may be the emitter identifier received from wireless emitter 502 or may be a string of common terms associated with wireless emitter 502 and/or target 501 (e.g., AHU, chiller, etc.). Target location 804 may be an alpha-numeric string that indicates a location of wireless emitter 502 based on the emitter identifier received from wireless emitter 502. For example, target location 804 may be a name of a room received from server 512 in response to a transmission of the emitter identifier to server 512 by mobile device 506. Signal strength indication 806 may be an alpha-numerical indication of the strength with which mobile device 506 is able to detect and read the emitter identifier transmitted by wireless emitter 502. This strength may be correlated to a distance from mobile device 506 to wireless emitter 502 and thus to target 501. In this way, the user may use signal strength indication 802 to navigate to wireless emitter 502 (i.e., by navigating such that signal strength increases, etc.). Mobile application 807 may also include a closest wireless emitter indication 807. Closest wireless emitter indication 807 may convey to the user the name of target 501 corresponding to the wireless emitter 502 that is closest to mobile device 506.

Mobile application 510 may also include an occupancy indication 808 and a selection button 810. Occupancy indication 808 may convey an occupancy within a target 501 proximate mobile device 506 to the user. This occupancy may be determined by BMS controller 366 based on other mobile devices 506 in the area which are communicating with server 512 (i.e., transmitting the emitter identifier for wireless emitter 502 corresponding to the target 501). Selection button 810 may facilitate user selection of various options within mobile application 510. For example, selection button 810 may facilitate user selection of any of target identification 802, target location 804, signal strength indication 806, and occupancy indication 808.

As shown in FIG. 8B, use of selection button 810 causes an information prompt 812 to be displayed on mobile device 506. According to an exemplary embodiment, information prompt 812 includes a graphical prompt 814, a status prompt 816, a first button 818, and a second button 820. Graphical prompt 814 and status prompt 816 may display additional information about the selection made through selection button 810. For example, if target identification 802 was selected through selection button 810, graphical prompt 814 may display a graphical representation (e.g., map, 3D model, floorplan, etc.) of the building including the component corresponding to wireless emitter 502. Graphical prompt 814 may include an indication on the graphical representation of where wireless emitters 502 detected by mobile device 506 are located. Status prompt 816 may display status information (e.g., operating characteristics, maintenance status, etc.) corresponding to the selection made through selection button 810. First button 818 and second button 820 may facilitate dismissal of information prompt 812, facilitate termination of mobile application 510, or further information. For example, selection of second button 820 may provide the user with advanced commands relating to information prompt 814 (i.e., "call service department," "report a problem," etc.).

According to various embodiments, any of target identification 802, target location 804, signal strength indication 806, and occupancy indication 808 may be pushed to mobile device 506. For example, when a user walks into a room with wireless emitter 502, this may cause any of target identification 802, target location 804, signal strength indication 806, and occupancy indication 808 for that wireless emitter 502 to be pushed to mobile device 506 (e.g., through mobile application 510, etc.).

Content Visualization

Conventionally, a building manager monitors various building components and rooms through the use of multiple monitors in a control room. Often, the building manager must navigate through different operating systems and software for performing maintenance, service management, and monitoring of BAS and BMS. In various applications, process 500 and/or process 600 are implemented with a visualization device rather than, or in addition to, mobile device 506. The visualization device may facilitate substantially hands-free user operation within process 500 and/or process 600. In this way, the visualization device may allow users to operate more efficiently and effectively. Rather than being required to navigate through a labyrinth of multiple screens each having important information, as is required for conventional building managers, the visualization device may directly overlay the content from server 512 on a user's vision thereby creating a heads-up display (HUD). The HUD presented through the visualization device may directly overlay content for targets 501 on the user's vision of targets 501 rather than via a mobile device (e.g., laptop, tablet, phone, etc.) or multiple screens. This visualization may simplify operation of process 500 and process 600 while providing in depth user interaction with the building.

Figure 9:
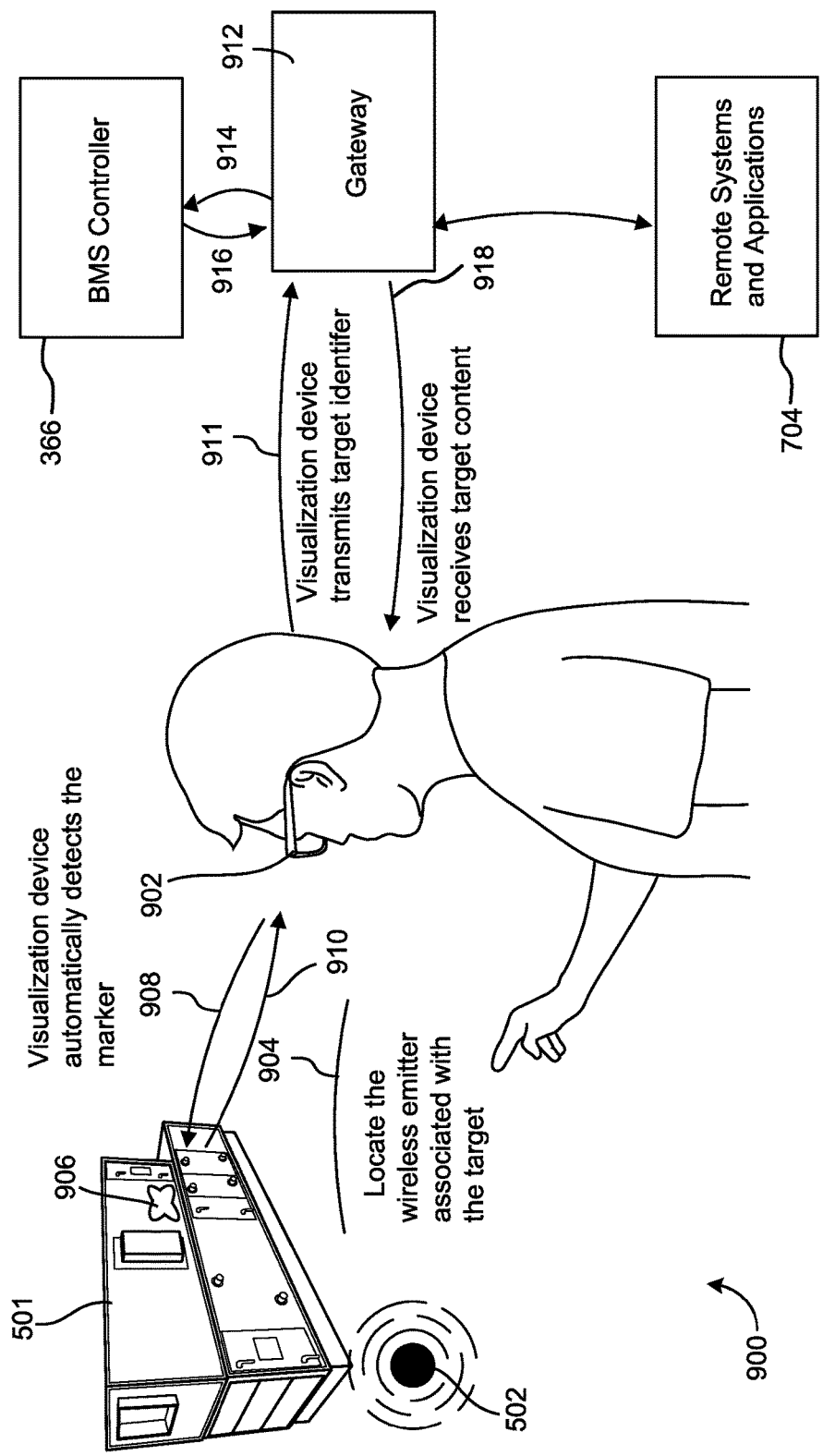
FIG. 9 is a flow diagram illustrating a process for receiving content for a target of the building of FIG. 1 on a visualization device using a wireless emitter associated with the target and a marker associated with the target, according to an exemplary embodiment.

Referring now to FIG. 9, a flow diagram illustrating a process 900 for providing content to a user about a target 501 is shown. Rather than displaying information on mobile device 506, as is done in process 500 and process 600, process 900 provides information about target 501 to a visualization device 902. According to various embodiments, visualization device 902 is configured to selectively provide the user with a holographic reality based on the target 501. For example, visualization device 902 may provide a completely 3D, hologram model of a target that is in front of the user. The content provided by visualization device 902 may include, for example, images (e.g., 3D augmented images, etc.), videos (e.g., 3D augmented videos, etc.), graphs, icons, and other similar content. Visualization device 902 may facilitate user interaction with the content. For example, visualization device 902 may facilitate user interaction with graphs, dashboards, and charts to see the status of the target and to control or command the target. According to one embodiment, visualization device 902 provides the user with a video overlaid on top of a 3D augmented image of target 501. Process 900 begins with locating wireless emitter 502 associated with target 501 (in step 904). Location of target 501 may be achieved by, for example, process 500.

In order to implement process 900, a marker 906 must be associated with target 501. Like wireless emitter 502, marker 906 may be placed on, mounted on, attached to, coupled to, or otherwise physically associated with target 501. For example, marker 906 may be placed on a control panel of target 501. Marker 906 may be various types of physical, image-based codes. For example, marker 906 may be a barcode, a QR code, or other similar visual marks. According to an exemplary embodiment, marker 906 is a VuMark by Vuforia™.

After locating wireless emitter 502, visualization device 902 automatically detects marker 906 (step 908). For example, the user may locate marker 906 while wearing visualization device 902, and visualization device 902 may recognizer marker 906 printed on a placard that the user is looking at. Visualization device 902 then reads marker 906 to obtain a target identifier from marker 906 (step 910). The target identifier corresponds to target 501 with which marker 906 is associated. The target identifier may be an identification number readable by BMS control 366, an alphanumeric string, a serial number, a part number, a location, or other similar identifying information.

Visualization device 902 then transmits (e.g., via Wi-Fi, etc.) the target identifier to a gateway 912 (step 911). According to various embodiments, gateway 912 serves as an intermediate between visualization device 902, BMS controller 366, and remote systems and applications 704. Gateway 912 may be, for example, a server, a computer, a routing hub, or other similar structure. After receiving the target identifier, gateway 912 routes (e.g., via Wi-Fi, etc.) the target identifier to BMS controller 366 (step 914). BMS controller 366 then determines, based on the target identifier from marker 906, which content in the BMS corresponds with target 501 and then transmits (e.g., via Wi-Fi, etc.) this content back to gateway 912 (step 916). For example, BMS controller 366 may determine that target 501 is a chiller. Following this example, BMS controller 366 may transmit a 3D model of the chiller, current operating conditions and characteristics, and other similar information to gateway 912.

According to an exemplary embodiment, BMS controller 366 contains a library of all content (e.g., alarms, measurements, data, commands, etc.) associated with each target identifier for each target 501 in the building. For example, for a target identifier that corresponds with a chiller, BMS controller 366 may contain alarms, temperature readings, air flow speeds, power consumption, occupancy, illumination levels, floor plans, schematics, computer-aided design models, and other similar metrics, as well as commands for increasing and decreasing a temperature set point of the chiller, commands for selecting various energy consumption plans (e.g., energy saver, high performance, sleep, etc.), and other similar commands. BMS controller 366 may also contain configuration information (e.g., location information, proximity information, service information, usage information, installation information, upgrade information, etc.) corresponding to each of targets 501 in the building. For example, BMS controller 366 may contain previous service dates and a suggested next service date for a chiller in the building.

After receiving the target content from BMS controller 366, gateway 912 routes (e.g., via Wi-Fi, etc.) the target content to visualization device 902 (step 918). Once received by visualization device 902, visualization device 902 may provide the target content to the user. In this way, the user may utilize visualization device 902 to overlay the target content on target 501. For example, process 900 may cause a 3D augmented model of target 501 to be displayed to the user via visualization device 902 when the user looks at target 501 through visualization device 902. Process 900 may also provide users the ability to control, and visualize operation of, target 501 through visualization device 902 in substantially real-time. Process 900 may be implemented such that process 900 occurs automatically when the user looks at marker 906. In these implementations, no user input is required and the user is provided the target content corresponding on marker 906 on visualization device 902.

Process 900 may improve user interaction with the building. For example, if a fault is reported in the building (e.g., by a customer, by a tenant, etc.), a user (e.g., technician, engineer, service professional, etc.) can go to the room where the target having the fault is located. The user may, for example, be guided to the target through process 500 and/or process 600. While wearing visualization device 902, the user may look at marker 906 corresponding to target 501 having the fault. The user may be provided with visualization device 902, for example, a 3D augmented model of target 501 showing failure points (e.g., fault locations, disconnections, error readings, etc.) in the operation of target 501. The user may also be provided through visualization device 902 with various service actions (e.g., work order details, contact service representative, order parts, emergency shutdown, manual override, etc.) corresponding to the failure points. Process 900 allows the user to visualize augmented information about target 501 thereby increasing the efficiency of the user leading to potential cost savings in operation of the building.

In another example, process 900 facilitates quick access by a user of checklists and work manuals pertaining to target 501. The user may observe, through visualization device 902, the exact design or working conditions of target 501 and follow step-by-step visual and/or audio instructions for how to service, repair, or maintain target 501. For example, visualization device 902 may provide the user with a tutorial, shown on an augment 3D model of target 501, of how to change an air filter of target 501. Because visualization device 902 is substantially hands-free, the user may use their hands to perform the service, repair, or maintenance as visualization device 902 is presenting the tutorial.

Additionally or alternatively, process 900 may provide remote technicians, in remote systems and applications 704, with information from visualization device 902. The remote technicians, in remote systems and applications 704, may communicate directly with the user through visualization device 902. The remote technicians, in remote systems and applications 704, may be provided with a point of view camera from visualization device 902 (i.e., via gateway 912). The remote technicians, in remote systems and applications 704, may also be provided with the 3D augment model of target 501. In this way, the user need not have a high level of training while the remote technicians, in remote systems and applications 704, have the necessary level of training. In this way, process 900 can increase the efficiency of users across various targets 501 by augmenting the knowledge of the user with the knowledge of remote technicians, in remote systems and applications 704.

In some embodiments, visualization device 902 is communicable with mobile device 506 when implementing process 900. In these embodiments, visualization device 902 may implement process 500 and/or process 600 and provide the user with content from content database 518 on visualization device 902. For example, process 900 may include guiding a user to target 501 by determining the location of the user, relative to target 501, based on wireless emitters 502 near the user. In another example, process 900 may include locating target 501 through wireless emitter 502 associated with target 501 as described in process 500 and process 600.

Figure 10:
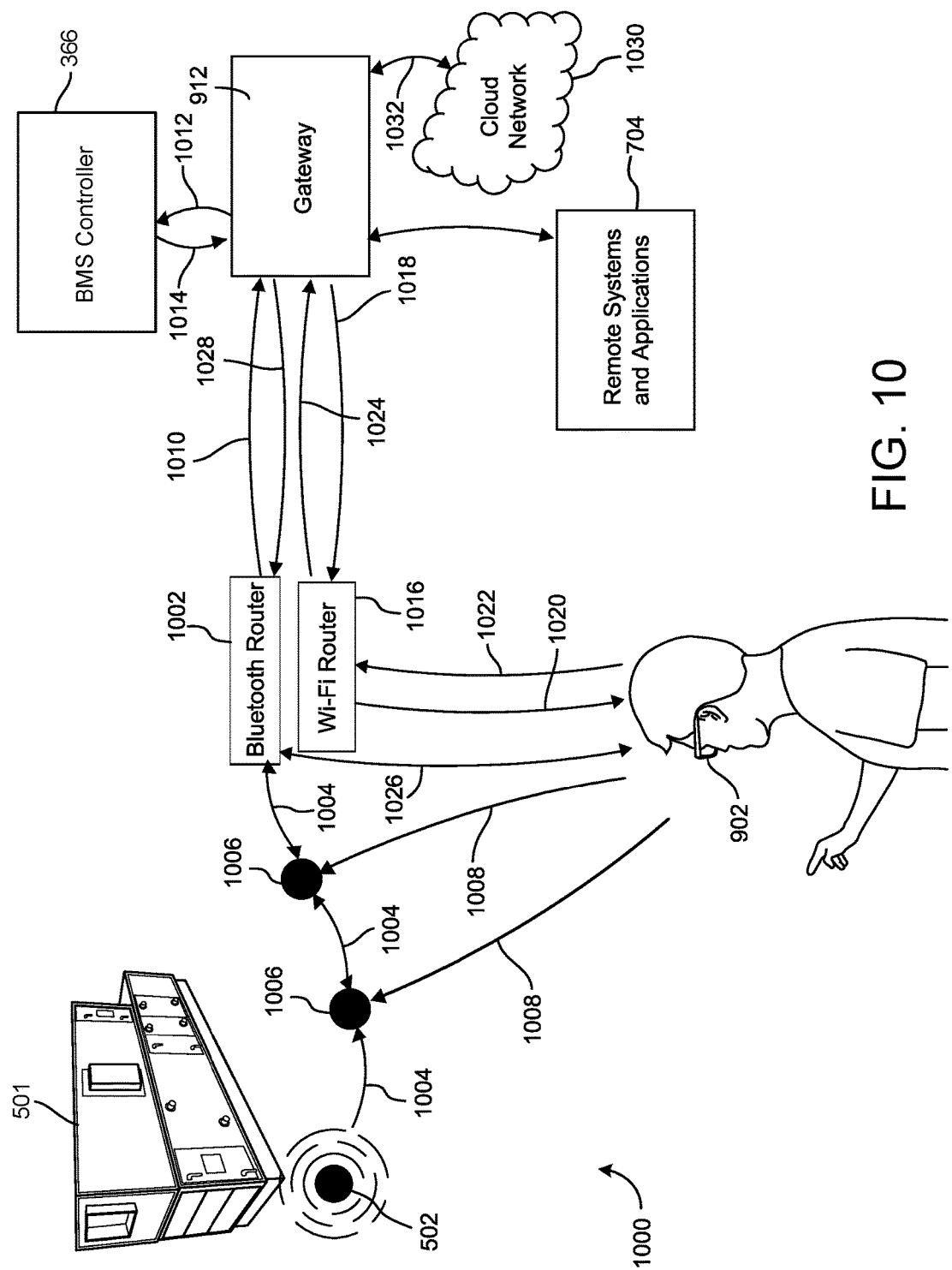
FIG. 10 is a flow diagram illustrating a process for receiving content for a target of the building of FIG. 1 on a visualization device using a wireless emitter associated with the target, according to an exemplary embodiment.

Referring now to FIG. 10, a process 1000 for providing content to a user about a target 501 is shown. Process 1000 utilizes wireless emitter 502 to transmit the emitter identifier, as described for process 500 and process 600, to a Bluetooth router 1002 (step 1004). Process 1000 utilizes a number of Bluetooth transceivers 1006 to selectively transmit the emitter identifier from wireless emitter 502 to Bluetooth router 1002. Bluetooth transceivers 1006 are configured to detect when the user, and hence visualization device 902, are near target 501. To facilitate this detection, visualization device 902 transmits a proximity indication via Bluetooth that is received by transceivers 1006 when in range of visualization device 902 (step 1008). Upon receiving the proximity indication from visualization device 902, transceivers 1006 transmit the emitter identifier from corresponding wireless emitter 502 to Bluetooth router 1002. In some embodiments, transceivers 1006 are associated with multiple wireless emitters 502. In these embodiments, transceivers transmit the emitter identifiers from all corresponding wireless emitters 502 to Bluetooth router 1002. For example, a room with a chiller, an AHU, and a boiler may each have different wireless emitters 502 but may share a common transceiver 1006. Following this example, when the user enters the room, the common transceiver 1006 may receive the proximity indication from visualization device 902 and transmit the emitter identifiers from the different wireless emitters 502 to Bluetooth router 1002.

Bluetooth router 1002 then communicates the emitter indicators to gateway 912 (step 1010). After receiving the emitter identifier, gateway 912 routes (e.g., via Wi-Fi, etc.) the emitter identifier to BMS controller 366 (step 1012). BMS controller 366 then determines, based on the emitter identifier from wireless emitter 502, which content in the BMS corresponds with target 501 and then transmits (e.g., via Wi-Fi, etc.) this content back to gateway 912 (step 1014).

Gateway 912 then transmits (e.g., via Wi-Fi, etc.) the content to a Wi-Fi router 1016 (step 1018). Wi-Fi router 1016 then transmits (e.g., via Wi-Fi, etc.) the content to visualization device 902 (step 1020). Visualization device 902 can then utilize the content to interact with target as described in process 900. Visualization device 902 transmits inputs to BMS controller 366 first to Wi-Fi router (step 1022) when then forwards the inputs to BMS controller 366 through gateway 912 (step 1024). For example, if the user requests, through visualization device 902, a floorplan of the floor where target 501 is located the request is routed through Wi-Fi router 1016 and gateway 912 to BMS controller 366. As described in process 900, process 1000 facilitates connection between remote systems and applications 704 (e.g., remote assistance, guidance, etc.) and visualization device 902, via gateway 912 and Wi-Fi router 1016.

In some implementations of process 1000, visualization device 902 communicates directly with Bluetooth router 1002 (step 1026). For example, visualization device 902 may communicate with Bluetooth router 1002 using Bluetooth low energy. Similarly, in some implementations of process 1000, gateway 912 transmits information (e.g., content, etc.) to Bluetooth router 1002 (step 1028). Bluetooth router 1002 may then, for example, transmit the information from gateway 912 to visualization device 902 (step 1026). In other implementations of process 1000, gateway 912 may communicate with a cloud network 1030 (step 1032). For example, cloud network 1030 may provide content to gateway 912. Cloud network 1030 may be, for example, a remote storage server or other similar network.

According to one example, target 501 is a control room on a floor of a building. Following this example, transceivers 1006 may be placed, for example, near an entrance to the floor. Transceivers 1006 may detect a proximity indication from visualization device 902 and, via process 1000, Wi-Fi router 1016 may provide the user with a floor plan, via visualization device 902, of the floor including, for example, a location of and/or directions to the control room. In some applications, the floor plan is displayed to the user in a 2D, 3D, or 3D augmented models. In this example, process 1000 may facilitate the user looking at the floor plan through visualization device 902 as the user walks through the floor.

For either of process 900 and process 1000, the user may perform various interactions through visualization device 902 with content provided by BMS controller 366. For example, visualization device 902 may display a 3D augmented view of target 501 to the user and allow the user to change operating characteristics of target 501 and observe changes to the 3D augmented model of target 501 before and after applying the changed operating characteristic to target 501. In one example, the user may utilize visualization device 902 to change the fan speed of an AHU by rotating a knob in the 3D augmented model provided by visualization device 902.

In some applications, visualization device 902 can translate gestures performed by the user into interactions with the content. For example, the user may utilize gestures to cause rotation, zooming, and selection of the content displayed via visualization device 902. In this way, visualization device 902 facilitates substantially hands-free interaction with the content displayed via visualization device 902. In some alternative applications, visualization device 902 may receive interactions via buttons, track pads, joysticks, and other similar devices on visualization device 902. In other alternative applications, visualization device 902 may receive interactions via a mobile device (e.g., mobile device 506, etc.).

According to various embodiments, the user may utilize visualization device 902 to share content with other users (e.g., via Bluetooth, via Wi-Fi, via NFC, etc.). For example, the user may utilize visualization device 902 to selectively transmit content to another user's mobile device or visualization device. Similar to the access level discussion of process 500 and process 600, the other user may or may not have the ability to access certain content (e.g., controls, etc.) based on an access level of the other user. Alternatively, the user with visualization device 902 may determine the exact content to provide to the other user.

Visualization device 902 may include, for example, any of a headset (e.g., ODG R-7 Glasses, ATHEER AiR, Samsung Gear VR®, Oculus Rift®, Google Cardboard®, Microsoft HoloLens®, HTC Vive®, Razer OSVR®, PlayStation VR®, Carl Zeiss Cinemizer®, Starbreeze StarVR®, etc.), an input device (e.g., Samsung Galaxy S6®, Samsung Galaxy Note 4®, iPhone 6®, iPad Air®, iPad Pro®, Nokia OZO Camera®, Leap Motion®, Intugine Nimble VR®, Sixense®, Virtuix Omni®, ZSpace®, etc.), software (e.g., Unity®, Oculus® Unity Package, Sixense® Unity plug-in, MiddleVR®, Virtual Human Toolkit, Impulsonic®, VREAM®, vorpX®, Vizard®, etc.), and content. According to an exemplary embodiment, visualization device 902 is R-7 Smart Glasses by ODG. Visualization device 902 may include, for example, batteries (e.g., dual 650 mAh lithium-ion, etc.), a trackpad, control buttons (i.e., for interacting with content, etc.), sensors (e.g., accelerometer, gyroscope, altitude sensor, humidity sensor, etc.), interchangeable lens (e.g., photochromic, clear, tinted, etc.), cameras (e.g., autofocus cameras, etc.), processing circuits (e.g., Qualcomm®Snapdragon™ 805 2.7 GHz quad-core processor, etc.), memory (e.g., 3 GB Pop LP-DDR3 RAM, 64 GB storage, etc.), operating systems (e.g., ReticleOS custom framework on Android KitKat, etc.), network antennas (e.g., Bluetooth 4.1, 802.11 ac, GNSS, etc.), removable ear horns, charging ports (e.g., magnetic USB, etc.), replaceable nose bridges (e.g., magnetically attached, etc.), displays (e.g., dual stereoscopic displays, etc.), audio ports (e.g., magnetic stereo audio ports with ear buds, etc.), and other similar components.

According to various embodiments, BMS and BAS applications are performed in at least one of BMS controller 366 and remote systems and applications 704. For example, BMS and BAS applications may be performed in BMS controller 366 via a cloud server. In this way, BMS controller 366 may provide visualization device 902 with substantially real time data. As described herein, the content provided to visualization device 902 may include 3D augmented models. According to various embodiments, 3D augmented models include holographic content different from augmented reality.

In some alternative embodiments, process 900 and process 1000 are implemented without utilizing wireless emitters 502 to determine the identity of target 501. Rather, visualization device 902 performs an image analysis (e.g., edge detection, shape detection, color detection, etc.) when the user is looking at target 501 to determine the identity of target 501. In these embodiments, process 900 would skip to step 910, and process 1000 would skip to step 1010. For example, visualization device 902 may compare a set of edges of target 501 with a database accessed by server 512 to determine if the set of edges of target 501 correspond to a recognized target stored in the database. In other applications, visualization device 902 may scan a serial number of target 501, determine a type of target for that serial number, and then compare an image analysis of target 501 with image analysis data for that type of target stored in a database accessed by server 512. In some of these applications, wireless emitters 502 may assist in edge detection of target 501 (e.g., serve as a set point for image analysis, etc.).

Annunciation

In some applications, it is desirable to create an annunciation (e.g., identification, announcement, etc.) at a target in a building. The annunciation may be used to indicate a location of the target or to convey a message to the users. The annunciation may be observed by users with or without mobile device 506 and/or visualization device 902. However, the annunciation may be made differently to users with mobile device 506 and/or visualization device 902. For example, based on the access level of the user with mobile device 506 and/or visualization device, information may be provided along with the annunciation. The annunciation may be performed by wireless emitter 502 and may be selectively controlled by, for example, a user on mobile device 506, a user on visualization device 902, and BMS controller 366. The annunciation may, for example, assist a user in locating a target component in a crowded control room.

Figure 11:
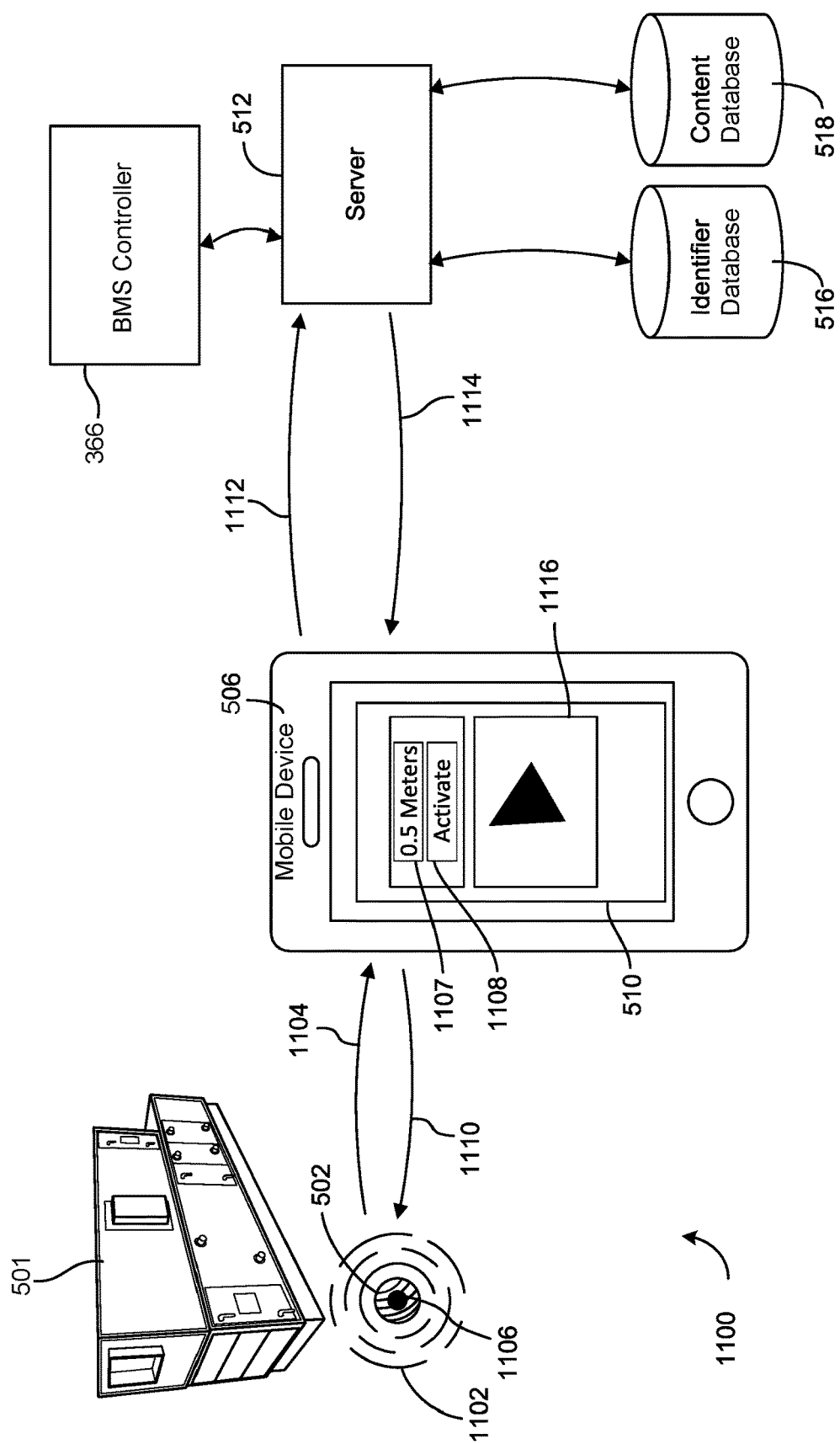
FIG. 11 is a flow diagram illustrating a process of annunciating an auxiliary device of a wireless emitter associated with the target, according to an exemplary embodiment.

Referring now to FIG. 11, a flow diagram illustrating a process 1100 for providing an annunciation originating at a target 501 is shown. According to process 1100, a wireless emitter 502 is associated with target 501. Wireless emitter 502 is configured to broadcast its emitter identifier in a range around target 501 (step 1102). In some embodiments, process 1100 requires that mobile device 506 is running mobile application 510. In other applications, process 1100 may cause mobile application 510 to be run on mobile application 510.

As soon as mobile device 506 is within the range of wireless emitter 502, mobile device 506 detects the emitter identifier (step 1104). According to various embodiments, wireless emitter 502 includes an auxiliary device 1106. In process 1100, wireless emitter 502 is configured to receive commands and selectively control auxiliary device 1106 according to the received commands to selectively annunciate the location of auxiliary device 1106. Auxiliary device 1106 may include, for example, a speaker, a horn, a whistle, a light (e.g., light emitting diode, etc.), a strobe light, a vibration generating device, a GPS beacon, a NFC beacon, a Bluetooth beacon, or other similar devices. As shown in FIG. 11, process 1100 is shown to implement mobile device 506. However, it is understood that visualization device 902 or other similar devices could similarly implement process 1100.

After the emitter identifier has been detected by mobile device 506, mobile device 506 determines a distance to wireless emitter 502. According to various embodiments, mobile device 506 determines this distance by reading the received signal strength indicator (RSSI) for the emitter identifier. If mobile application 510 is not running, the reception of the emitter identifier may cause mobile application 510 to be displayed on mobile device 506. Mobile application 510 may display a distance indication 1107. Distance indication 1107 may indicate to the user the distance (e.g., 0.5 meters, etc.) from mobile device 506 to wireless emitter 502.

Mobile application 510 may display an auxiliary button 1108. Auxiliary button 1108 is configured to selectively control (e.g., actuate, etc.) auxiliary device 1106 (step 1110). For example, if auxiliary device 1106 is a speaker configured to selectively emit a chirp, depression of auxiliary button 1108 by the user will cause auxiliary device 1106 to emit a chirp. Through the use of auxiliary button 1108, the user can selectively control auxiliary device 1106 to assist in navigation to wireless emitter 502 and target 501. Auxiliary button 1108 may include additional controls and commands depending on the configuration of auxiliary device 1106. For example, if auxiliary device 1106 includes a speaker and a lighting element, auxiliary button 1108 may facilitate independent control of the speaker and the lighting element.

Depending on the distance from mobile device 506 to wireless emitter 502, the controls and commands may be transmitted differently from mobile device 506 to wireless emitter 502. For example, as the distance between mobile device 506 and wireless emitter 502 decreases, the pitch of a noise emitter from auxiliary device 1106 may increase. In another example, auxiliary device 1106 may emit a sound when the user is more than a target distance from wireless emitter 502 and then auxiliary device 1106 may emit a sound and a light when the user is within the target distance from wireless emitter 502. Other examples of controlling auxiliary device 1106 are also possible. For example, sound may be emitted more rapidly from auxiliary device 1106 or a light may be blinked more rapidly from auxiliary device 1106 as a user approaches wireless emitter 502.

In some embodiments, auxiliary device 1106 is configured to emit a sound synchronously or asynchronously with noises emitted from target 501. For example, if target 501 emits noise in a pattern, auxiliary device 1106 may be configured to emit a sound when target 501 is not emitting noise. In these embodiments, auxiliary device 1106 may incorporate microphones, sensors, a processing circuit, or other equipment to determine when noise is emitted from target 501. In other embodiments, auxiliary device 1106 is configured to modulate motor windings of target 501 to emit a noise. These embodiments may be advantageous because auxiliary device 1106 can utilize existing motors, thereby lowering potential costs associated with process 1100.

In other embodiments, auxiliary button 1108 can be utilized by the user to annunciate all auxiliary devices 1106 for all wireless emitters 502 within a target range of mobile device 506. For example, auxiliary button 1108 can be utilized by the user to annunciate all auxiliary devices 1106 for all wireless emitters 502 within twenty meters.

Similar to process 500, process 1100 includes mobile device 506 transmitting the emitter identifier from wireless emitter 502 to server 512 (step 1112). Mobile device 506 may also transmit a location of mobile device 506 (e.g., obtained via GPS, etc.) to server 512. Server 512 then retrieves a relative location of wireless emitter 502 from BMS controller 366 and/or content database 518. Server 512 then transmits the relative location of wireless emitter 502 to mobile device 506 (step 1114). After receiving the relative location of wireless emitter 502, mobile application 510 may update and/or populate distance indication 1107.

Additionally or alternatively to distance indication 1107, mobile application may include a direction indication 1116. Direction indication 1116 may cooperate with distance indication 1107 to navigate the user to wireless emitter 502 and target 501. Direction indication 1116 may be, for example, a movable icon (e.g., arrow, etc.) that is configured to direct the user to wireless emitter 502 and target 501. Distance indication 1107 may also give directional indications (e.g., north, south, east, west, left, right, back, forward, etc.) to the user. Further, any or both of distance indication 1107 and directional indication 1116 may be a graphical representation of a floor plan on which wireless emitter 502 is located. For example, distance indication 1107 may show a floor plan including a first icon indicating the location of mobile device 506, a second icon indicating the location of wireless emitter 502, and a path therebetween.

In some situations, multiple targets 501 will be in range of mobile device 506 simultaneously. In these situations, mobile application 510 may allow selection of a single target 501 from a list of all targets 501 in range of mobile device 506. In this way, mobile device 506 can selectively locate a single target 501 near other targets 501. This may be particularly advantageous when target 501 is in a location with multiple other targets 501 (e.g., in a control room, etc.).

In other applications, it may be desirable to selectively cause auxiliary devices 1106 from all targets 501 in range of mobile device 506 to be controlled at the same time. For example, in the event of an emergency (e.g., evacuation, etc.), wireless emitters 502 could be utilized to alert the user of the emergency through a simultaneous broadcast of a warning sound (e.g., alert, siren, etc.).

In another application, wireless emitters 502 could be controlled in concert to guide the user to a desired location. For example, in the event of an emergency where vision may be impaired (e.g., by smoke, etc.), a user may be guided to a first wireless emitter 502 by a sound emitted by a first auxiliary device 1106 corresponding to the first wireless emitter 502 and then to a second wireless emitter 502 by a sound wireless emitter 502 by a sound emitted by a second auxiliary device 1106, thereby progressively leading the user towards a target area (e.g., an evacuation zone, a stairwell, etc.).

In these applications, BMS controller 366 may selectively control auxiliary devices 1106 via mobile device 506 without user interaction or input. In some applications, distance indicator 1106 and directional indicator 1108 may display a warning (e.g., WARNING—EMERGENCY, etc.). In emergency situations, mobile application 510 may allow the user to transmit an emergency stop command via auxiliary button 1108 or otherwise to BMS controller 366 through server 512 such that various targets in the building are powered off during the emergency.

In some alternative embodiments, wireless emitter 502 is connected to server 512 via a wired connection. For example, wireless emitter 502 may be wired to server 512 via Ethernet, BACnet, or RS485. In some applications, wireless emitter 502 is configured to selectively control auxiliary device 1106 in response to commands from server 512. For example, BMS controller 366 may convey an annunciation command through server 512 to auxiliary device 1106, via an Ethernet connection.

In other applications, mobile device 506 is configured to emit annunciations (e.g., via a speaker on mobile device 506, via headphones connected to mobile device 506, via a vibration from mobile device 506, via a notification displayed on mobile device 506, etc.) in response to an annunciation command sent from BMS controller 366 through server 512. For example, wireless emitter 502 may be communicable with server 512 via a wired connection such that when mobile device 506 is within a range of wireless emitter 502, wireless emitter 502 transmits an indication to BMS controller 366 via server 512. In response to this indication, BMS controller 366 may, for example, transmit an annunciation command to mobile device 506, via server 512, instructing mobile device 506 to emit an annunciation. In this way, the user may be alerted of his proximity to wireless emitter 502.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The background section is intended to provide a background or context to the invention recited in the claims. The description in the background section may include concepts that could be pursued but are not necessarily ones that have been previously conceived or pursued. Therefore, unless otherwise indicated herein, what is described in the background section is not prior art to the present invention and is not admitted to be prior art by inclusion in the background section.

What is claimed is:

1. A system for locating a target in a building, the system comprising:
   a server;
   a first wireless emitter associated with the target and configured to emit a first emitter identifier within a first range;
   a second wireless emitter not associated with the target and configured to emit a second emitter identifier within a second range; and
   an application on a mobile device configured to:
      detect the first emitter identifier when the mobile device is within the first range;
      transmit the first emitter identifier to the server in response to detecting the first emitter identifier;
      receive a first content from the server, the first content corresponding to the first emitter identifier;
      display the first content on the mobile device;
      detect the second emitter identifier when the mobile device is within the second range;
      transmit the second emitter identifier to the server in response to detecting the second emitter identifier;
      receive an input from a user, the input corresponding to the target; and
      transmit the target to the server;
   wherein the server is configured to not transmit a second content corresponding to the second emitter identifier to the mobile device in response to determining that the second emitter identifier does not correspond to the target.

2. The system of claim 1, wherein the server is configured to push the first content to the application and the application is further configured to display the first content on the mobile device upon receiving the first content and without requiring input from the user.

3. The system of claim 1, wherein the first wireless emitter is configured to continuously emit the first emitter identifier regardless of a presence of the mobile device within the first range and communicate with the mobile device only over Bluetooth; and
   wherein the first wireless emitter comprises a battery.

4. The system of claim 1, further comprising:
   an identifier database communicable with the server, the identifier database comprising a library of emitter identifiers associated with targets in the building, the first emitter identifier contained within the library of emitter identifiers, the identifier database configured to:
      receive the first emitter identifier from the server; and
      determine the target based on a comparison between the first emitter identifier and the library of emitter identifiers; and
   a content database communicable with the server, the content database comprising a library of content associated with the targets in the building, the first content contained within the library of content, the content database configured to:
      receive the target from the server; and
      determine the first content based on a comparison between the target and the library of content.

5. The system of claim 1, further comprising:
   an identifier database communicable with the server, the identifier database comprising a library of emitter identifiers associated with targets in the building, the first emitter identifier and the second emitter identifier contained within the library of emitter identifiers, the identifier database configured to:
receive the first emitter identifier and the second emitter identifier from the server; and
compare the first emitter identifier and the second emitter identifier to the library of emitter identifiers;
determine that the second emitter identifier does not correspond to the target; and
determine that the first emitter identifier corresponds to the target; and
a content database communicable with the server, the content database comprising a library of content associated with targets in the building, the first content and the second content contained within the library of content, the content database configured to:
receive the target from the server; and
determine the first content based on a comparison between the target and the library of content.

6. A system for displaying content to a user, the system comprising:
a marker associated with a target;
a gateway communicable with a building management system (BMS) controller;
a server;
a first wireless emitter associated with the target and configured to emit a first emitter identifier within a first range;
a second wireless emitter not associated with the target and configured to emit a second emitter identifier within a second range; and
an application on a visualization device worn by a user and communicable with the gateway, the application configured to:
automatically detect the marker when the user is proximate the marker;
read the marker to obtain a target identifier corresponding to the target; and
transmit the target identifier to the gateway;
wherein the gateway is configured to:
transmit the target identifier to the BMS controller; and
receive target content from the BMS controller, the target content corresponding to the target; and
wherein the application is further configured to:
receive the target content from the gateway;
display the target content to the user;
detect the first emitter identifier when the visualization device is within the first range;
transmit the first emitter identifier to the server in response to detecting the first emitter identifier;
receive a first content from the server, the first content corresponding to the first emitter identifier;
display the first content on the visualization device;
detect the second emitter identifier when the visualization device is within the second range;
transmit the second emitter identifier to the server in response to detecting the second emitter identifier;
receive an input from the user, the input corresponding to the target; and transmit the target to the server;
wherein the server is configured to not transmit a second content corresponding to the second emitter identifier to the visualization device in response to determining that the second emitter identifier does not correspond to the target.

7. The system of claim 6, wherein the target content comprises a three-dimensional model of the target; and wherein the application facilitates interaction by the user with the three-dimensional model of the target.

8. The system of claim 6, wherein the application is configured to display the target content to the user automatically, without requiring input from the user, upon detection of the marker.

9. The system of claim 6, wherein the application is further configured to determine a position of the user; and
wherein the first content comprises directions from the position of the user to the target.

10. The system of claim 6, further comprising:
an identifier database communicable with the server, the identifier database comprising a library of emitter identifiers associated with targets in a building, the first emitter identifier and the second emitter identifier contained within the library of emitter identifiers, the identifier database configured to:
receive the first emitter identifier and the second emitter identifier from the server; and
compare the first emitter identifier and the second emitter identifier to the library of emitter identifiers;
determine that the second emitter identifier does not correspond to the target; and
determine that the first emitter identifier corresponds to the target; and
a content database communicable with the server, the content database comprising a library of content associated with targets in the building, the first content and the second content contained within the library of content, the content database configured to:
receive the target from the server; and
determine the first content based on a comparison between the target and the library of content.

11. The system of claim 6, wherein the first wireless emitter is configured to continuously emit the first emitter identifier regardless of a presence of the visualization device within the first range and communicate with the visualization device only over Bluetooth; and
wherein the first wireless emitter comprises a battery.

12. A system for providing an annunciation to a user, the system comprising:
a server;
an application on a mobile device communicable with the server;
a first wireless emitter associated with a target in a building and communicable with the mobile device, the first wireless emitter comprising an auxiliary device selectively controllable to emit an annunciation; and
a second wireless emitter not associated with the target and configured to emit a second emitter identifier within a second range;
wherein the application is configured to:
selectively control the auxiliary device when the mobile device is within a first range of the first wireless emitter;
determine a distance between the mobile device and the first wireless emitter when the mobile device is within the first range;
display the distance to the user on the mobile device;
detect the second emitter identifier when the mobile device is within the second range;
transmit the second emitter identifier to the server in response to detecting the second emitter identifier;
receive an input from a user, the input corresponding to the target; and
transmit the target to the server;

wherein the server is configured to not transmit a second content corresponding to the second emitter identifier to the mobile device in response to determining that the second emitter identifier does not correspond to the target.

13. The system of claim 12, wherein the application is further configured to cause the auxiliary device to emit the annunciation when the mobile device is within the first range.

14. The system of claim 12, wherein the application is further configured to:
cause the auxiliary device to alter the annunciation based on the distance; and
determine the distance by reading a received signal strength indicator for the first wireless emitter.

15. The system of claim 12, wherein the first wireless emitter is configured to emit a first emitter identifier;
wherein the application is further configured to:
detect the first emitter identifier;
transmit the first emitter identifier to the server in response to detecting the first emitter identifier;
receive first content from the server, the first content corresponding to the first emitter identifier; and
display the first content on the mobile device, the first content comprising a directional indicator related to a position of the target relative to the mobile device.

16. The system of claim 15, further comprising:
an identifier database communicable with the server, the identifier database comprising a library of emitter identifiers associated with targets in the building, the first emitter identifier contained within the library of emitter identifiers, the identifier database configured to:
receive the first emitter identifier from the server; and
determine the target based on a comparison between the first emitter identifier and the library of emitter identifiers; and
a content database communicable with the server, the content database comprising a library of content associated with targets in the building, the first content contained within the library of content, the content database configured to:
receive the target from the server; and
determine the first content based on a comparison between the target and the library of content.

17. The system of claim 12, wherein the first wireless emitter is configured to continuously operate regardless of a presence of the mobile device within the first range and communicate with the mobile device only over Bluetooth; and
wherein the first wireless emitter comprises a battery.

* * * * *